(12) United States Patent
Otani et al.

(10) Patent No.: US 7,374,480 B2
(45) Date of Patent: May 20, 2008

(54) GAME PERFORMING METHOD, STORAGE MEDIUM, GAME APPARATUS, DATA SIGNAL AND PROGRAM

(75) Inventors: Takashi Otani, Yokohama (JP); Hiroaki Yotoriyama, Kawasaki (JP)

(73) Assignee: Namco Bandai Games Inc., Tokyo (JP)

( * ) Notice: Subject to any disclaimer, the term of this patent is extended or adjusted under 35 U.S.C. 154(b) by 634 days.

(21) Appl. No.: 10/445,250

(22) Filed: May 27, 2003

(65) Prior Publication Data

US 2003/0236111 A1   Dec. 25, 2003

(30) Foreign Application Priority Data

Jun. 21, 2002   (JP)   ............................. 2002-182210

(51) Int. Cl.
*A63F 13/00*   (2006.01)
(52) U.S. Cl. ...................... 463/8; 463/1; 463/7; 463/43
(58) Field of Classification Search .................. 463/8–9
See application file for complete search history.

(56) References Cited

U.S. PATENT DOCUMENTS

| | | | | |
|---|---|---|---|---|
| 5,580,308 | A | * | 12/1996 | Nakamura ...................... 463/7 |
| 6,162,120 | A | * | 12/2000 | Takahashi et al. ............. 463/8 |
| 6,340,330 | B1 | * | 1/2002 | Oishi et al. .................... 463/8 |
| 6,755,743 | B1 | * | 6/2004 | Yamashita et al. ............ 463/42 |

FOREIGN PATENT DOCUMENTS

| | | | |
|---|---|---|---|
| JP | A 8-196744 | * | 8/1996 |
| JP | A 11-244533 | | 9/1999 |
| JP | A 2000-107438 | | 4/2000 |
| JP | A 2001-157782 | | 6/2001 |
| JP | 2001-334069 | * | 12/2001 |
| JP | A 2001-340650 | | 12/2001 |
| JP | 2002-066140 | | 3/2002 |
| JP | A 2002-273045 | * | 9/2002 |

OTHER PUBLICATIONS

Gundam Network Operation, Online Player vol. 008 Online Game Magazine, pp. 66 and 67.
Tactical Commanders, Online Player vol. 001 Online Game Magazine, pp. 45 and 49.
Ultima Online the Second Age, the official guide of Renaissance edition., pp. 268, 269, 272 and 274.

* cited by examiner

*Primary Examiner*—Robert E. Pezzuto
*Assistant Examiner*—Omkar A. Deodhar
(74) *Attorney, Agent, or Firm*—Oliff & Berridge, PLC

(57) ABSTRACT

A method for adding a new game performance to a game wherein players enjoy operating own registered characters by inputting own accounts. The game performing method for performing a predetermined game wherein a plurality of players operates own registered characters by inputting own accounts, has: storing a plurality of characters including a registered character; storing play data of the plurality of characters; determining one character of the plurality of characters instead of the registered character to be a player character of a player according to an operation inputted by the player; selecting the registered character corresponding to an account of the player as a CPU character from the plurality of characters; and performing a fight of the CPU character selected against the player character determined by controlling an action of the CPU character on the basis of play data corresponding to the CPU character.

20 Claims, 39 Drawing Sheets

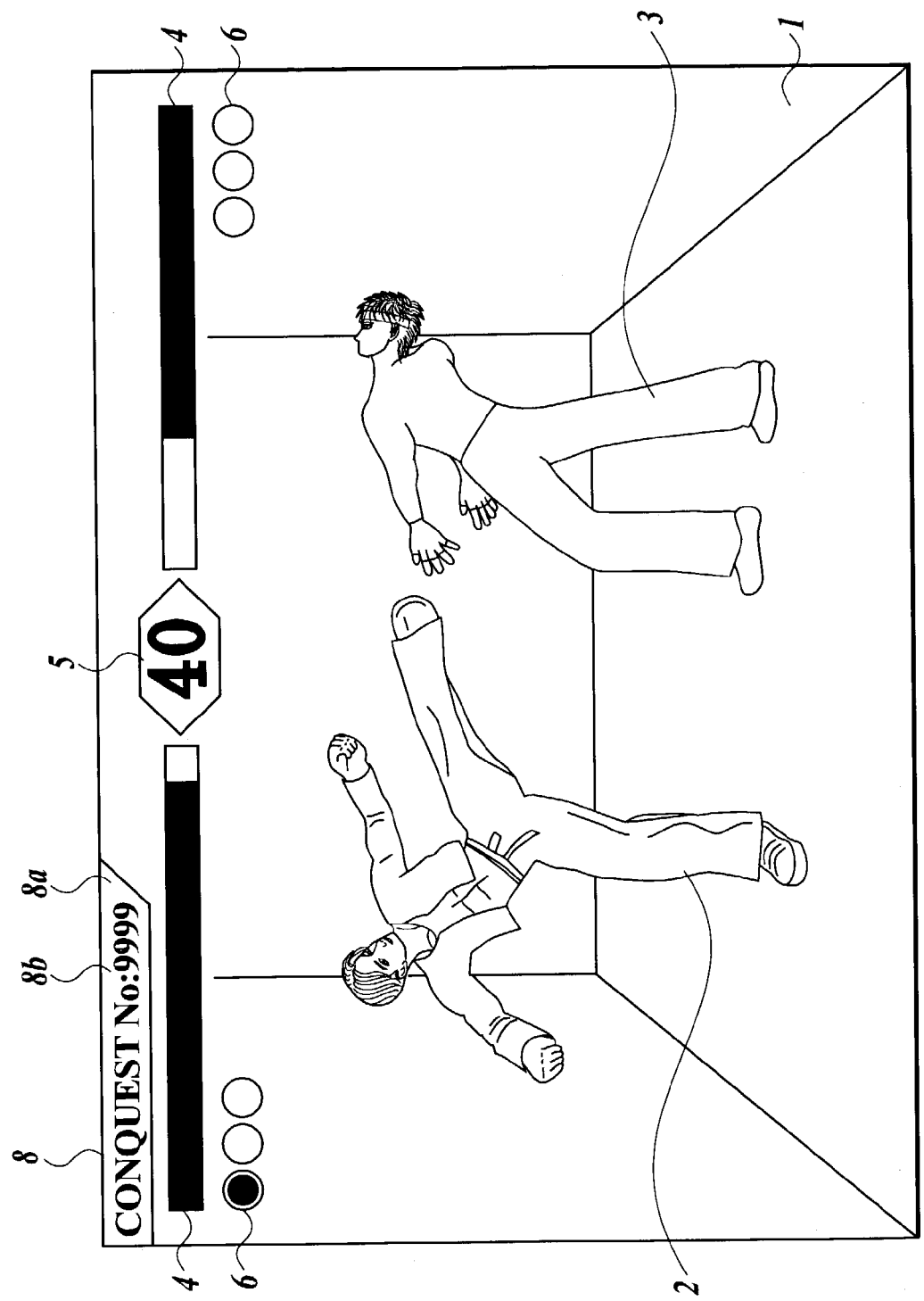

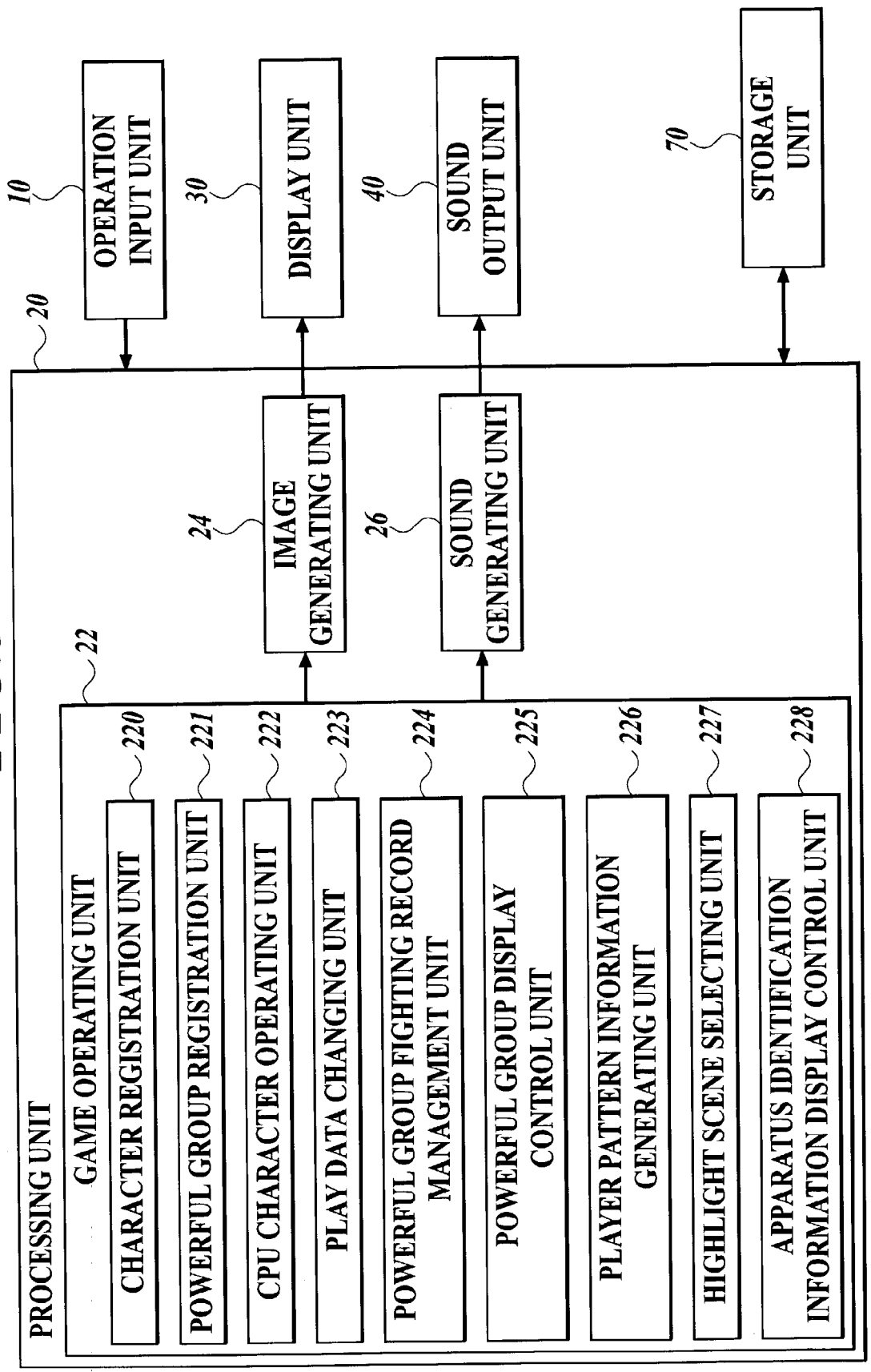

FIG.6

PLAYER PATTERN INFORMATION (734j)

| ATTACK | INPUT TYPE | | |
|---|---|---|---|
| | PUNCH | KICK | SPECIFIC ATTACK A |
| NUMBER OF INPUTS (TIMES) | 12 | 58 | 5 |
| INPUT FREQUENCY (%) | 16 | 77 | 7 |

| DEFENCE | INPUT TYPE | | |
|---|---|---|---|
| | UPPER GUARD | MIDDLE GUARD | LOWER GUARD |
| NUMBER OF INPUTS (TIMES) | 2 | 58 | 2 |
| INPUT FREQUENCY (%) | 3 | 94 | 3 |

| MOVEMENT | INPUT TYPE | | |
|---|---|---|---|
| | SIDE STEP | BACK | TURN AND GO INTO |
| NUMBER OF INPUTS (TIMES) | 30 | 45 | 5 |
| INPUT FREQUENCY (%) | 38 | 56 | 6 |

FIG.7

THINGKING PATTERN CORRESPONDENCE TABLE ~740a

| REMARKED CHARACTER | KUNIMITU | | | |
|---|---|---|---|---|
| | OPPONENT'S CHARACTER | | | |
| LEVEL RANGE | SAIKA | DUKE | · · · | |
| 1~5 | EASY 1 | EASY 2 | · · · | |
| 6~10 | NORMAL 1 | NORMAL 2 | · · · | |
| 10~15 | HARD 1 | HARD 2 | · · · | |
| 16~20 | VERY HARD 1 | VERY HARD 2 | · · · | |
| 20~ | ULTRA-HARD 1 | ULTRA-HARD 2 | · · · | |

FIG.8

POWERFUL GROUP REGISTRATION INFORMATION

| POWERFUL GROUP No. | POWERFUL GROUP No. | 744a |
|---|---|---|

| THE NUMBER OF CHARACTERS | 12 | 744b |
|---|---|---|

| CONTROL RATIO | 25% | 744c |
|---|---|---|

| POWERFUL GROUP'S FIGHTING RECORD | 15 WINS AND 5 LOSSES IN 20 FIGHTS | 744d |
|---|---|---|

| LEADER CHARACTER | REGISTERED No. 1 | 744e |
|---|---|---|

ASSIGNED CHARACTER TABLE — 744f

| RANKING | PASSWORD | CHARACTER NAME | FIGHTING RECORD | LEVEL |
|---|---|---|---|---|
| 1 | PASSWORD-1 | CHARACTER-1 | 99 WINS AND 1 LOSS | 20 |
| 2 | PASSWORD-2 | CHARACTER-2 | 90 WINS AND 10 LOSSES | 12 |
| 3 | PASSWORD-3 | CHARACTER-3 | 89 WINS AND 11 LOSSES | 12 |
| ... | ... | ... | ... | ... |

POWERFUL GROUP CHANGING TABLE

| ELEMENTS<br>OF WIN-LOSS PATTERN | OBTAINED CONTROL RATIO<br>(%) |
|---|---|
| PERFECT WIN | +0.10 |
| WIN | +0.05 |
| LOSS | -0.05 |
| PERFECT LOSS | -0.10 |

| ELEMENTS OF<br>SUCCESSIVE WINS | OBTAINED CONTROL RATIO<br>(%) |
|---|---|
| TWO SUCCESSIVE WINS | +0.05 |
| THREE SUCCESSIVE WINS | +0.10 |
| ⋮ | ⋮ |
| ALL WINS | +0.40 |

| ELEMENTS OF<br>SUCCESSIVE LOSSES | OBTAINED CONTROL RATIO<br>(%) |
|---|---|
| TWO SUCCESSIVE LOSSES | -0.05 |
| THREE SUCCESSIVE LOSSES | -0.10 |
| ⋮ | ⋮ |
| ALL LOSSES | -0.40 |

FIG.10

| | 748 |

| HIGHLIGHT SCENE SELECTING CONDITION ||
|---|---|
| CONDITION No. | CONDITION |
| 1 | A POWERFUL GROUP DISAPPEARS |
| 2 | A POWERFUL GROUP UNIFIES GAME AREA |
| 3 | FOUR SUCCESSIVE WINS |
| 4 | 10 SUCCESSIVE COMBOS |
| ⋮ | ⋮ |

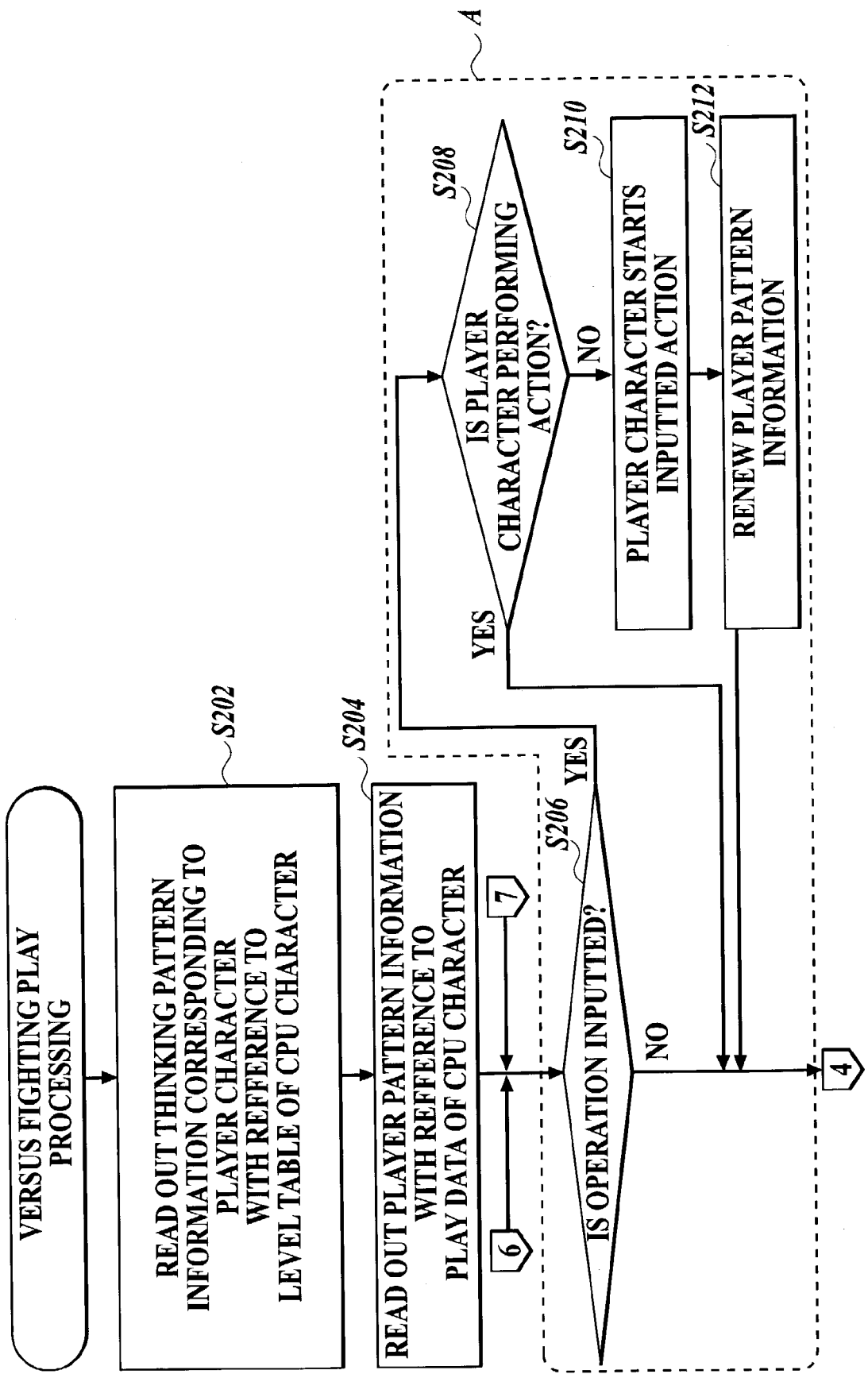

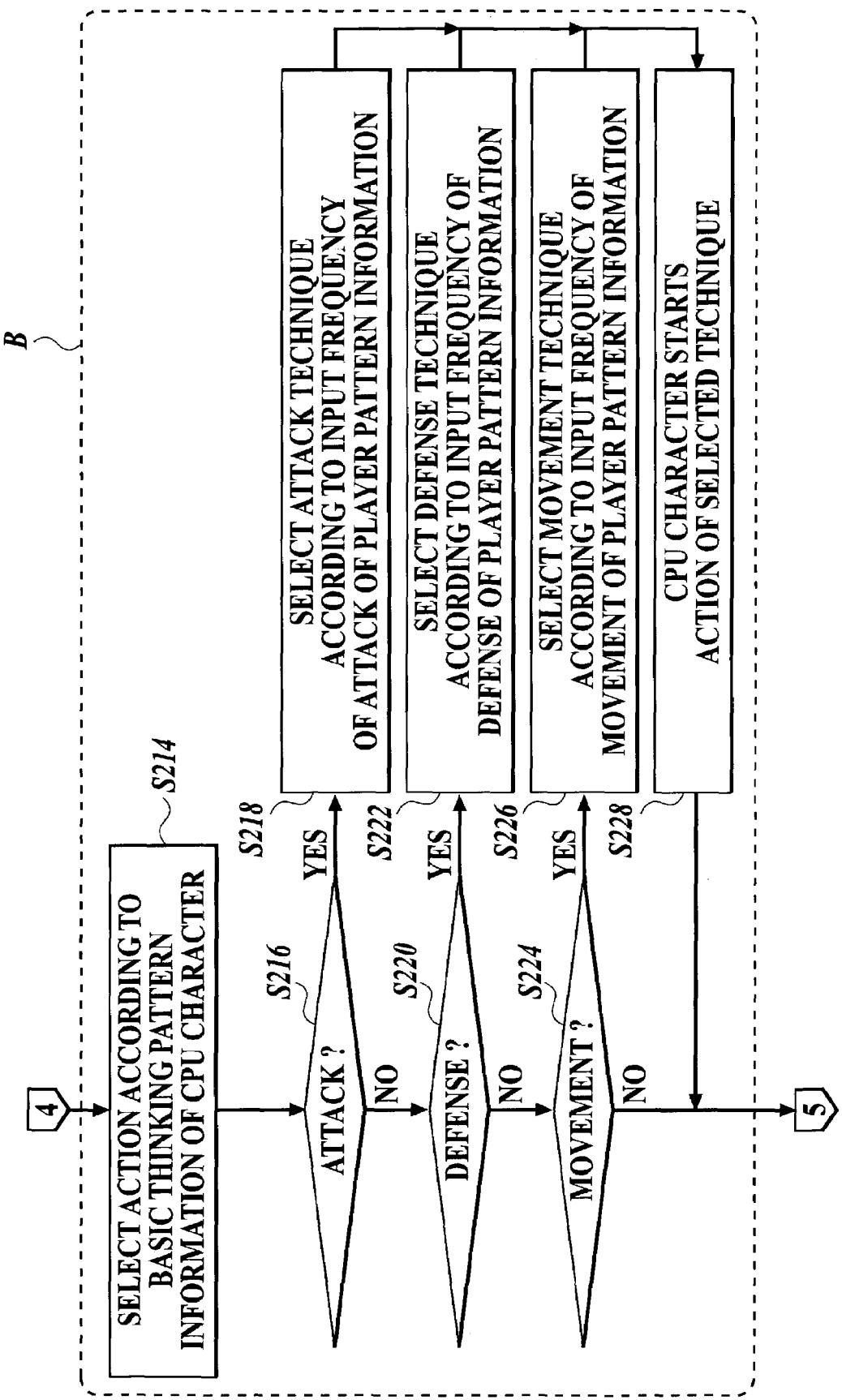

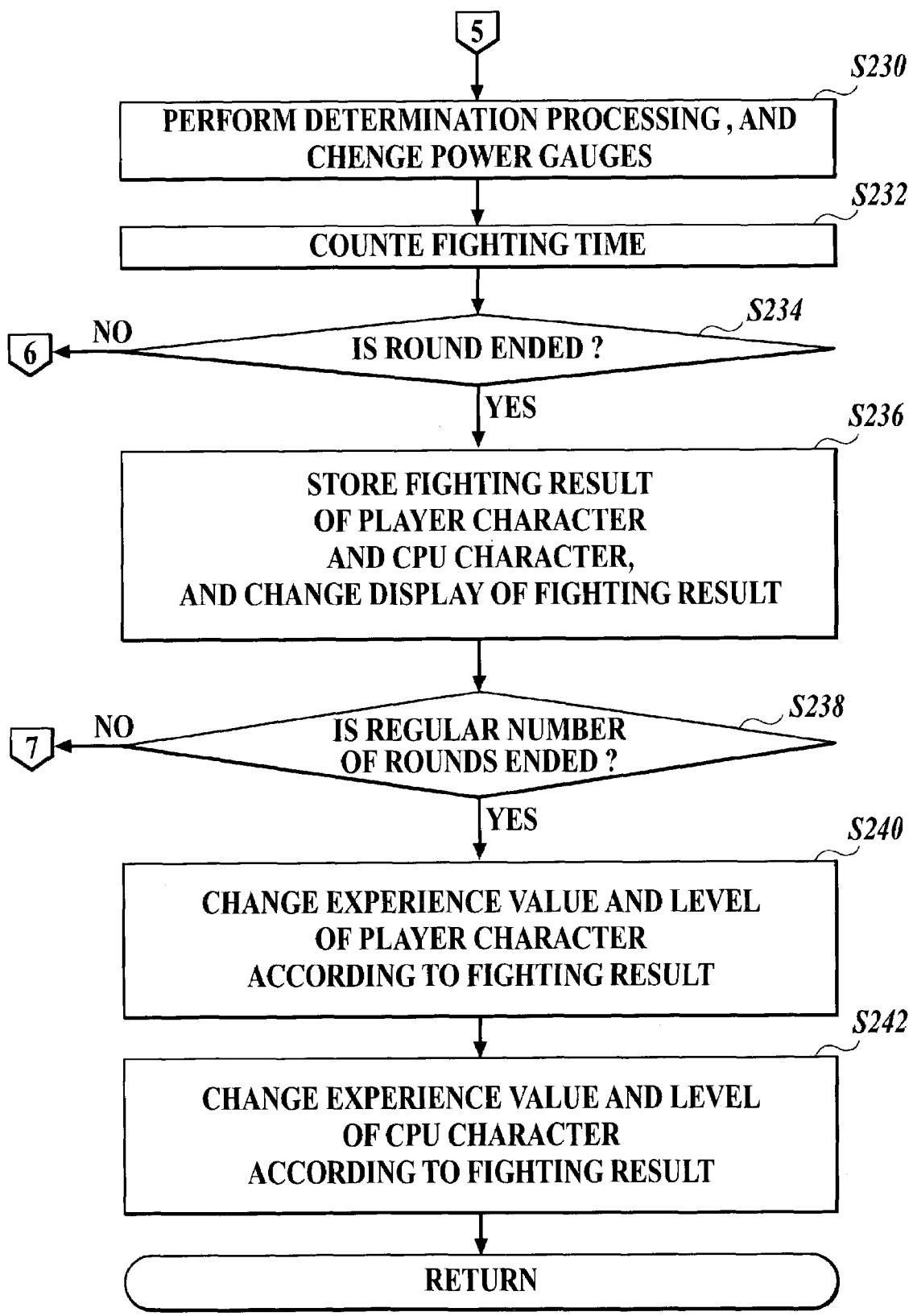

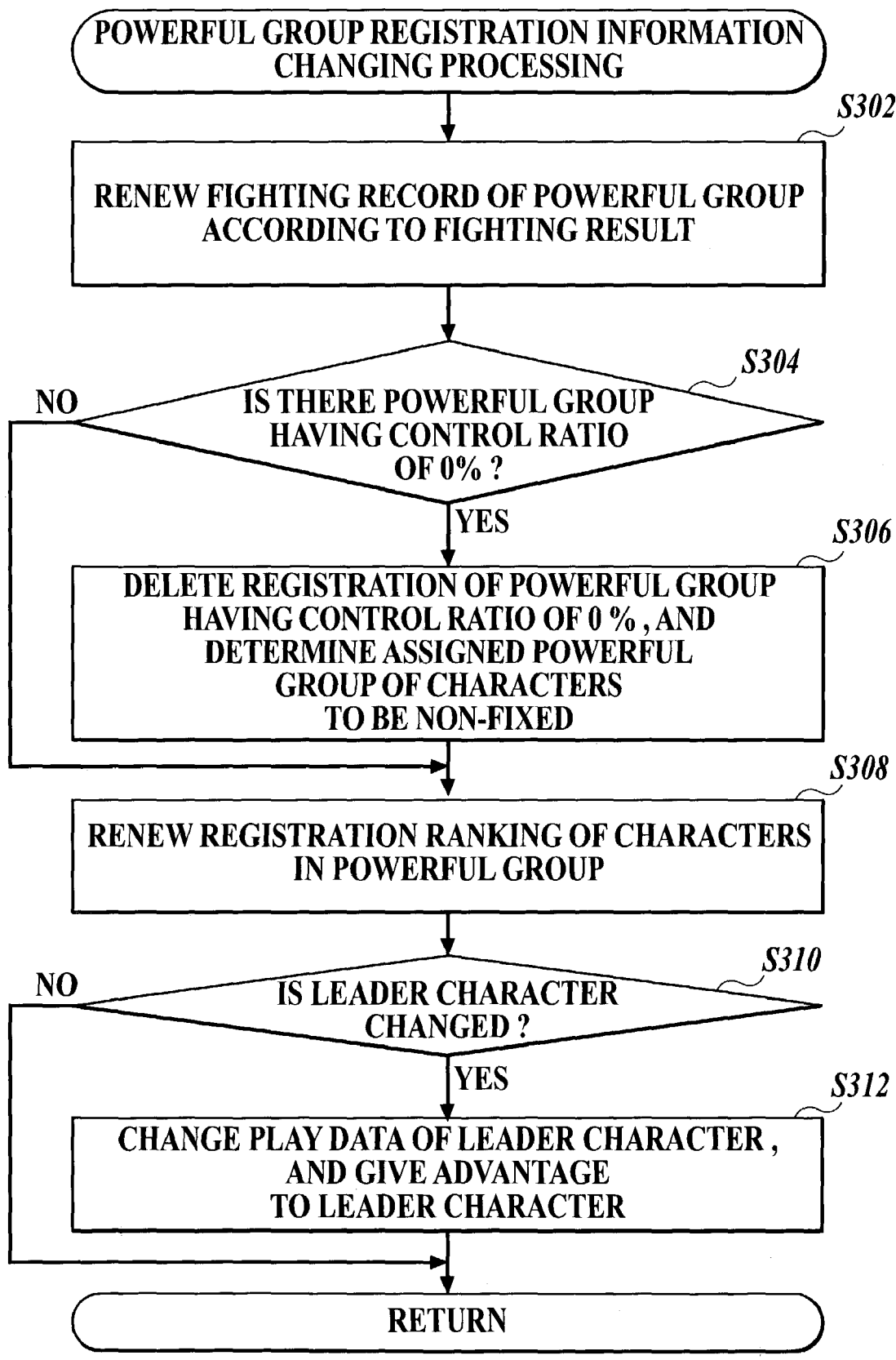

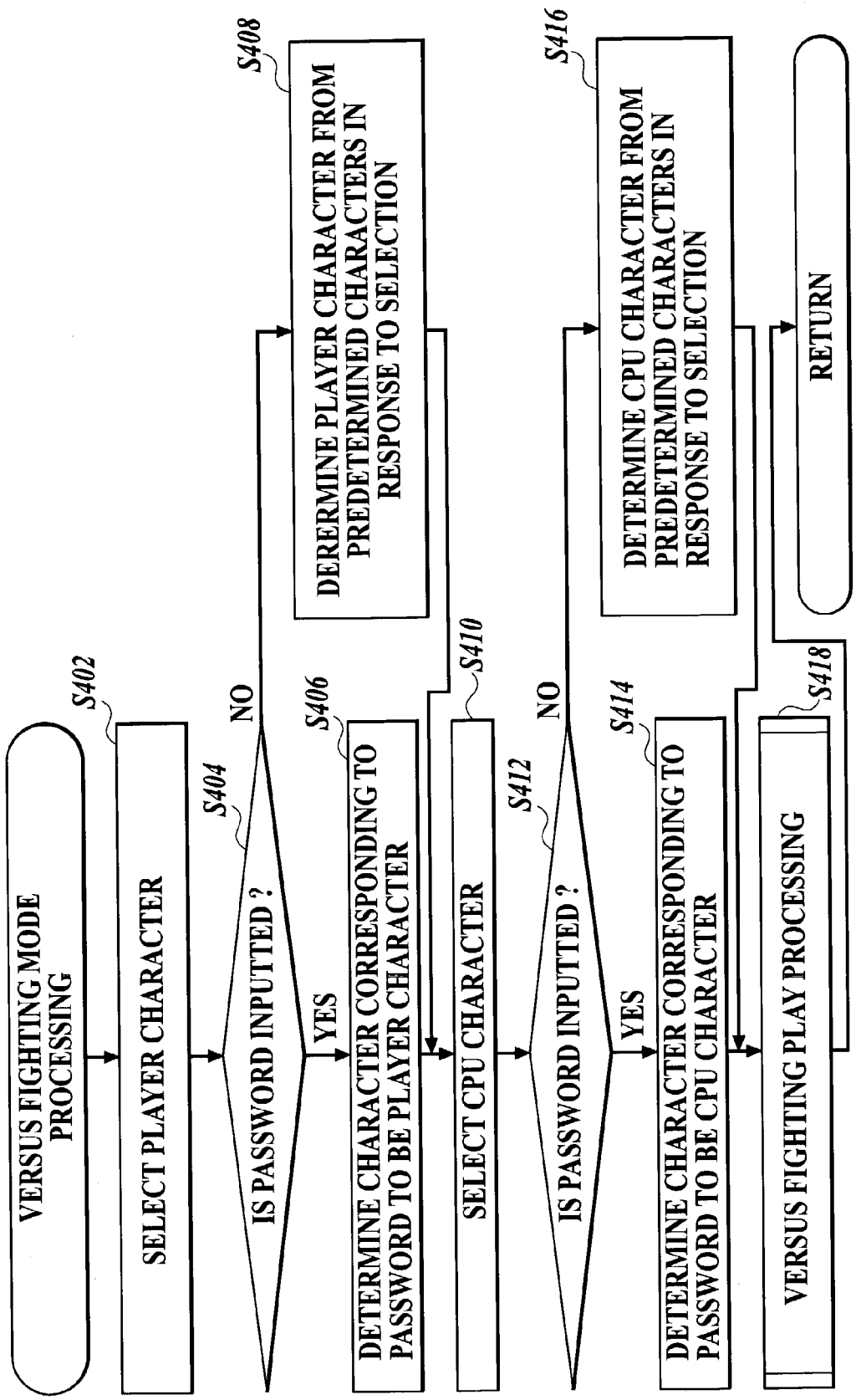

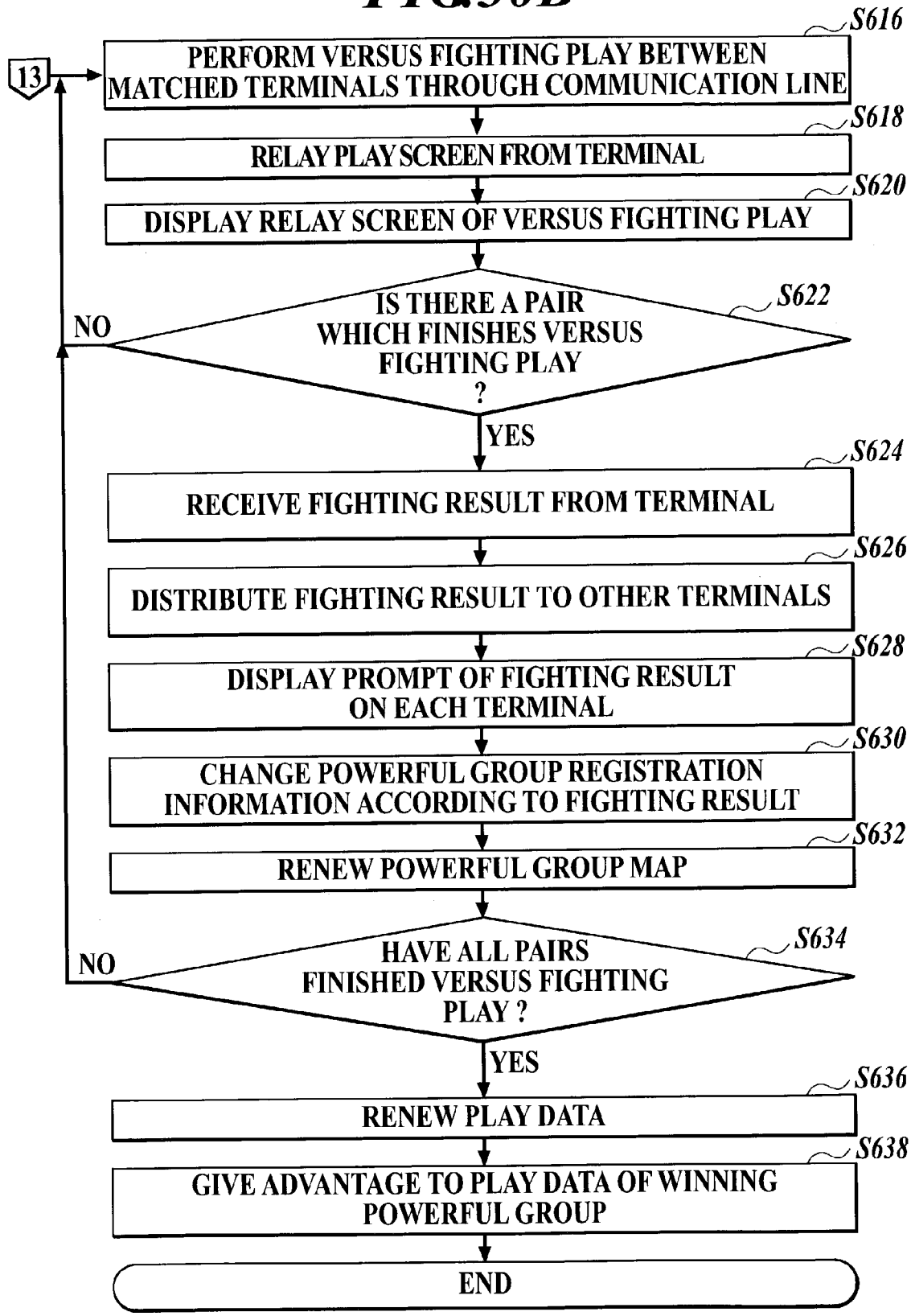

GAME PERFORMING METHOD, STORAGE MEDIUM, GAME APPARATUS, DATA SIGNAL AND PROGRAM

BACKGROUND OF THE INVENTION

1. Field of the Invention

The invention relates to a game performing method or the like used for making an apparatus such as a computer perform a predetermined game.

2. Description of Related Art

In an earlier development, a game using a game performing method that a player registers a character as a player character which fights against a character registered by another player in a game world, has been well-know.

For example, there is an action role playing game wherein a player character of a player is set as a brave handling a sword and magic, attacks each of castles possessed by characters of other players studded in the game world and captures the castles. A character such as a monster is registered by each of the other players in each castle to wait and fight with the player character. In cases where the player character defeats the monster or the like and captures a castle, the player can get a predetermined bonus, and the player character can become a new possessor of the castle. Thereafter, the player newly registers a monster in his castle and prepares for the attack of the character registered by another player. The player character extends his or her controlled area by attacking castles one by one, and aims at becoming a conqueror of the game world.

A real-time type game of the above-described action game using the registered characters is popular, the real time type game that one player fights against another player indirectly in the game world, even though another player does not operate the game terminal simultaneously.

However, in the above-described game, a character registered by each player always fights against only a character registered by another player.

SUMMARY OF THE INVENTION

The present invention was developed in view of the above-described problem.

It is an object of the present invention to add a new game performance to a predetermined game wherein a plurality of players enjoy operating own registered characters by inputting own accounts.

In accordance with a fist aspect of the present invention, a game performing method for performing a predetermined game wherein a plurality of players operates own registered characters by inputting own accounts, comprises: storing a plurality of characters including a registered character; storing play data of the plurality of characters; determining one character of the plurality of characters instead of the registered character to be a player character of a player according to an operation inputted by the player; selecting the registered character corresponding to an account of the player as a CPU character from the plurality of characters; and performing a fight of the CPU character selected against the player character determined by controlling an action of the CPU character on the basis of play data corresponding to the CPU character.

In accordance with a second aspect of the present invention, a game performing method for performing a predetermined game wherein a plurality of players operates own registered characters by inputting own accounts, the method comprises: storing a plurality of characters including a registered character; storing play data of the plurality of characters; determining the registered character to be a player character of a player according to an operation inputted by the player; selecting one character from the plurality of characters other than the registered character, as a CPU character; and performing a fight of the CPU character selected against the player character determined by controlling an action of the CPU character on the basis of play data corresponding to the CPU character.

In accordance with a third aspect of the present invention, a game apparatus for performing a predetermined game wherein a plurality of players operates own registered characters by inputting own accounts, comprises: a character storage for storing a plurality of characters including a registered character; a play data storage for storing play data of the plurality of characters stored in the character storage; a player character determination section for determining one character of the plurality of characters stored in the character storage instead of the registered character to be a player character of a player according to an operation inputted by the player; a CPU character selecting section for selecting the registered character corresponding to an account of the player as a CPU character from the plurality of characters stored in the character storage; and a fighting section for performing a fight of the CPU character selected by the CPU character selecting section against the player character determined by the player character determination section by controlling an action of the CPU character on the basis of play data corresponding to the CPU character.

In accordance with a fourth aspect of the present invention, a game apparatus for performing a predetermined game wherein a plurality of players operates own registered characters by inputting own accounts, comprises: a character storage for storing a plurality of characters including a registered character; a play data storage for storing play data of the plurality of characters stored in the character storage; a player character determination section for determining the registered character to be a player character of a player according to an operation inputted by the player; a CPU character selecting section for selecting one character from the plurality of characters stored in the character storage other than the registered character, as a CPU character; and a fighting section for performing a fight of the CPU character selected by the CPU character selecting section against the player character determined by the player character determination section by controlling an action of the CPU character on the basis of play data corresponding to the CPU character.

For example, the game apparatus includes a game apparatus having a stand-alone function or a game apparatus consisting of a system realizable of a network game. The structure of the system realizable of the network game includes, for example, a fist structure wherein a game terminal such as a personal computer prepared at home, a consumer game machine or the like is connected to a server through a wired or wireless communication line such as the Internet, a private line or the like, a second structure wherein a plurality of game terminals are directly connected to each other through a communication line without using a server, a third structure wherein a plurality of game terminals are connected to each other through a communication line, and one of the game terminals functions as a server, and a fourth structure wherein a plurality of game terminals are physically connected to each other so as to be integrally formed into one system (for example, an arcade game system).

The account is information used for identifying the player when participating in the game. For example, the account includes a password, a member's number, a handle name and so on.

The player character is a character operated by a player who enjoys playing the game by using the apparatus. The CPU character is a character operated by the apparatus which functions as a virtual player by performing an operation according to a predetermined thinking routine. The player character fights against the CPU character in the fighting play.

The play data are information including a game play condition of the character when the character is stored. For example, the play data include an experience value, a power, money of the character, items held by the character, fighting records, flags of various events, game consideration and the like.

According to the method of the first aspect or the apparatus of the third aspect of the present invention, the character used by the player when playing the game and the play data of the character are related to the account, and stored as the registered character. The player can operate a character different from his own registered character, and select the registered character as the CPU character by inputting the account. The registered character selected as the CPU character is operated on the basis of the play data according to the registered character. Consequently, the character can enjoy playing the fight against his own registered character which has been trained by the player.

According to the method of the second aspect or the apparatus of the fourth aspect of the present invention, the player can operate his own registered character which has been trained by the player as the player character, and make the registered character fight against another his own registered character.

Preferably, the method of the second aspect of the present invention, further comprises: determining one character of the plurality of characters instead of the registered character to be the player character of the player according to the operation inputted by the player; and selecting the registered character corresponding to an account of the player as the CPU character from the plurality of characters.

Preferably, in the apparatus of the fourth aspect of the present invention, the player character determination section determines one character of the plurality of characters stored in the character storage instead of the registered character to be the player character of the player according to the operation inputted by the player, and the CPU character selecting section selects the registered character corresponding to an account of the player as the CPU character from the plurality of characters stored in the character storage.

According to the above-described method or apparatus, it is possible to obtain the same effect as one of the method or apparatus in accordance with the second or fourth aspect of the present invention. Further, the player can operate a character different from his own registered character which has been trained by the player, and enjoy playing the fight against the registered character.

Preferably, the method of the first or second aspect of the present invention, further comprises: reading the account out of a storage medium storing at least one account therein.

Accordingly, it is possible to obtain the same effect as one of the method in accordance with the first or second aspect of the present invention. Further, because the account is read out of the storage medium, it is possible to save the player inputting the account, and the player can participate in the game easily.

Preferably, the method of the first or second aspect of the present invention, further comprises: storing thinking pattern information related to values of predetermined parameters of the plurality of characters, wherein the performing a fight includes performing the fight by controlling the action of the CPU character on the basis of thinking pattern information related to a value of a predetermined parameter of the CPU character read out of the thinking pattern information stored.

The thinking pattern information is information on the thinking pattern of the character when being operated as the CPU character, and called a thinking routine.

Accordingly, it is possible to obtain the same effect as one of the method in accordance with the first or second aspect of the present invention. Further, it is possible to play the game by controlling the character on the basis of the thinking pattern changing according to growth of the character.

Preferably, the method of the first aspect of the present invention, further comprises: renewing play data of the registered character selected as the CPU character, and play data of the one character determined to be the player character, on the basis of a result of the fight.

Preferably, the method of the second aspect of the present invention, further comprises: renewing play data of the one character selected as the CPU character, and play data of the registered character determined to be the player character, on the basis of a result of the fight.

Preferably, the apparatus of the third aspect of the present invention, further comprises: a renewing section for renewing play data of the registered character selected as the CPU character by the CPU character selecting section, and play data of the one character determined to be the player character by the player character determination section, on the basis of a result of the fight performed by the fighting section.

Preferably, the apparatus of the fourth aspect of the present invention, further comprises: a renewing section for renewing play data of the one character selected as the CPU character by the CPU character selecting section, and play data of the registered character determined to be the player character by the player character determination section, on the basis of a result of the fight performed by the fighting section.

Accordingly, it is possible to obtain the same effect as one of the method or apparatus in accordance with the first, second, third or fourth aspect of the present invention. Further, it is possible to renew the play data of the registered character of the player on the basis of the result of the fight. Consequently, for example, in an action game, when the player performs the fight against the registered character of the player, the player can make the registered character gain more experience and grow up.

Preferably, in the above-described method, the play data include action frequency information of the character corresponding to the play data when the character fights against another character, the renewing play data includes renewing action frequency information of the registered character on the basis of the result of the fight, when the registered character of the player is determined to be the player character, and the performing a fight includes performing the fight by controlling the action of the CPU character on the basis of action frequency information of the CPU character.

Preferably, in the above-described apparatus, the play data include action frequency information of the character corresponding to the play data when the character fights against another character, the renewing section renews action frequency information of the registered character on the basis of the result of the fight performed by the fighting section, when the registered character of the player is determined to be the player character by the player character determination section, and the fighting section controls the action of the CPU character on the basis of action frequency information of the CPU character.

The action frequency information is information on the frequency of the action taken by the registered character operated by the player, for every type of the action, that is, a play style of the player.

Accordingly, it is possible to obtain the same effect as one of the above-described method or apparatus. Further, because the action frequency information of the registered character is renewed even when the player uses the registered character as the player character, it is possible that the registered character always takes over a new action frequency of the player. Consequently, because the registered character can fight against the CPU character having the newest play stile of the player, the player can recognize his own play style as the third player, and make the play style useful for the future game play.

Preferably, in the above-described method, the action frequency information includes information on a frequency for every action of the character corresponding to a type of the operation for the character inputted by the player when performing the fight.

Preferably, in the above-described apparatus, the action frequency information includes information on a frequency for every action of the character corresponding to a type of the operation for the character inputted by the player when performing the fight.

The type of the operation means not only each input type such as a direction in which an operation lever is operated by the player, a type of an operation button operated by the player or the like, but also a combination of a plurality of operation levers or button inputted by the player simultaneously.

Accordingly, it is possible to obtain the same effect as one of the above-described method or apparatus. Further, the action frequency information is not merely copy information of the operation inputted by the player but information on the tendency of the operation inputted by the player. Consequently, when the registered character is selected as the CPU character, the player can enjoy playing the unexpected fight that the CPU character takes a similar action to the play style of the player but sometimes uses a technique which is not used by the player.

Preferably, in the above-described method, the action frequency information includes a frequency for every technique type capable of being performed by the character.

Preferably, in the above-described apparatus, the action frequency information includes a frequency for every technique type capable of being performed by the character.

Accordingly, it is possible to obtain the same effect as one of the above-described method or apparatus. Further, because the frequency is determined so as to relate the operation inputted by the player to the technique type, it is possible to express the tendency of the technique selected by the player.

Preferably, the method of the first or second aspect of the present invention, further comprises: determining a plurality of powerful groups; registering a registered character to any one of the plurality of powerful groups on the basis of the operation inputted by the player, when the registered character is newly registered; and managing a fighting result of each of the plurality of powerful groups on the basis of a result of the fight.

Preferably, the apparatus of the third or fourth aspect of the present invention, further comprises: a powerful group determination section for determining a plurality of powerful groups; a powerful group registration section for registering a registered character to any one of the plurality of powerful groups determined by the powerful group determination section on the basis of the operation inputted by the player, when the registered character is newly registered; and a powerful group fighting result management section for managing a fighting result of each of the plurality of powerful groups on the basis of a result of the fight performed by the fighting section.

Accordingly, it is possible to obtain the same effect as one of the method or apparatus in accordance with the first, second, third or fourth aspect of the present invention. Further, it is possible to determine groups of registered characters in the game world, and perform the fight between the groups.

Preferably, the above-described method further comprises: receiving a consideration of the predetermined game, wherein the managing a fighting result includes managing the fighting result of each of the plurality of powerful groups on the basis of the consideration of the predetermined game received.

The consideration of the game means one paid and consumed as a charge of the game. For example, the consideration includes, for example, coins, medals, electric money, points, items or money.

Accordingly, it is possible to obtain the same effect as one of the above-described method. For example, it is possible to give advantage which is effective when the powerful group plays the game so that the fighting result of the powerful group rises, the powerful group can use a stronger item or the like according to the consideration inputted by the player.

Preferably, the above-described method further comprises: deleting registrations of characters registered to any one of the plurality of powerful groups having the fighting result satisfying a predetermined condition.

Accordingly, it is possible to obtain the same effect as one of the above-described method. Further, the powerful group may be destroyed or disappeared according to the fighting result. Consequently, the player can enjoy playing the game under high tension.

Preferably, the above-described method further comprises: determining a character satisfying a predetermined condition among registered characters, for each of the plurality of powerful groups, and changing play data of the character determined.

The predetermined condition is one for comparing and determining characters assigned to one powerful group so as to select the character which has the highest experience value, a specific item, a predetermined number of successive wins, a winning ratio higher than a predetermined value, a predetermined title given as an indicator of strength or the like.

Accordingly, it is possible to obtain the same effect as one of the above-described method. Further, it is possible to prepare the system for giving advantage to any one of characters of one powerful group, for example, according to services of the characters.

Preferably, in the above-described method, the registering a registered character includes deleting a registration of a character satisfying a predetermined condition from characters registered to any one of the plurality of powerful groups to which the registered character is newly registered, and newly registering the registered character to the any one of the plurality of powerful groups, when the number of the characters is a maximum registration number.

The predetermined condition is determined so as to specify the character which is not used for predetermined days from the last time, is registered at the fist, does not have the predetermined number of wins or the like.

Accordingly, it is possible to obtain the same effect as one of the above-described method. Further, even if the character belongs to any one of powerful groups, when the character satisfies the predetermined condition, the character is excluded from the powerful group and a new character instead of the character is assigned to the power group. Consequently, because the predetermined condition is determined, it is possible to delete the registered character, and use the storage area of the apparatus effectively. As a result, it is possible to urge the player to play the game more actively.

Preferably, the method of the first or second aspect of the present invention, further comprises: receiving a consideration of the predetermined game for every player; and changing the play data when the consideration of the predetermined game is received.

The consideration of the game means one paid and consumed as a charge of the game. For example, the consideration includes, for example, coins, medals, electric money, points, items or money.

Accordingly, it is possible to obtain the same effect as one of the method in accordance with the first or second aspect of the present invention. For example, it is possible to give advantage which is effective when the player plays the game so that the experience value of the player rises, the player can use a stronger item or the like according to the consideration inputted by the player.

Preferably, the method of the first or second aspect of the present invention, further comprises: receiving the account; managing play date information for every player on the basis of a receiving date of the account; storing event information on events having occurred while performing the predetermined game in time series; and reading event information of an event having occurred between the receiving date of the account and a last playing time included in the play data information of the player corresponding to the account, out of the event information stored, and outputting it.

The event includes, for example, an event carried out on a specific day such as Christmas event, a specific result of the fighting play such as ten successive wins, another player going with the character or the like.

Accordingly, it is possible to obtain the same effect as one of the method in accordance with the first or second aspect of the present invention. Further, the player can acknowledge events having occurred since the player played the game at the last time to the present. Consequently, the player can closely relate to the game world, and enjoy playing the game more sufficiently.

Preferably, the method of the first or second aspect of the present invention, further comprises: storing identification information on a game apparatus used for performing the method; and reading and displaying the identification information stored at a predetermined time.

Preferably, the apparatus of the third or fourth aspect of the present invention, further comprises: an apparatus identification information storage for storing identification information on the apparatus; and an identification information display section for reading and displaying the identification information stored in the apparatus identification information storage at a predetermined time.

The registered character is stored in one apparatus. Therefore, even though the player inputs the correct account in another apparatus, there is a case where the player cannot play the game in the apparatus. Accordingly, it is possible to obtain the same effect as one of the method or apparatus in accordance with the first, second, third or fourth aspect of the present invention. Further, it is possible to prevent the case occurring by giving the apparatus identification information to the player.

In accordance with a fifth aspect of the present invention, a storage medium has information recorded thereon, when the information is loaded onto an operating apparatus, the information making the operating apparatus execute the method as described above.

In accordance with a sixth aspect of the present invention, a data signal embodied in a carrier wave, comprises information used for executing the method as described above.

In accordance with a seventh aspect of the present invention, a program makes an operating apparatus execute the method as described above, when the program is loaded onto the operating apparatus.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 2 is a view showing an example of a game screen in a versus fighting game;

FIGS. 3A and 3B are block diagrams showing examples of a functional structure of the arcade game apparatus 1300 according to the first embodiment;

FIG. 6 is a view showing an example of a data structure of player pattern information 734j;

FIG. 7 is a view showing an example of a data structure of a thinking pattern correspondence table 740;

FIG. 8 is a view showing an example of a data structure of powerful group registration information 744;

FIG. 9 is a view showing an example of a data structure of a powerful group changing table 746;

FIG. 10 is a view showing an example of a data structure of a highlight scene selecting condition 748;

FIGS. 12A and 12B are flow charts for explaining a flow of a versus fighting play processing according to the first embodiment;

FIG. 13 is a flow chart for explaining the flow of the versus fighting play;

FIG. 14 is a flow chart for explaining a flow of a powerful group registration information changing processing;

FIG. 15 is a flow chart for explaining a flow of a versus fighting mode processing;

FIGS. 30A and 30B are flow charts for explaining a flow of a processing according to the third embodiment.

PREFERRED EMBODIMENTS OF THE INVENTION

First Embodiment

Hereinafter, a first embodiment to which the present invention is applied will be explained with reference to FIGS. 1 to 10, in detail. According to the first embodiment, the case the present invention is applied to a versus fighting action game will be explained as an example.

[Explanation of Structure]

Figure 1:
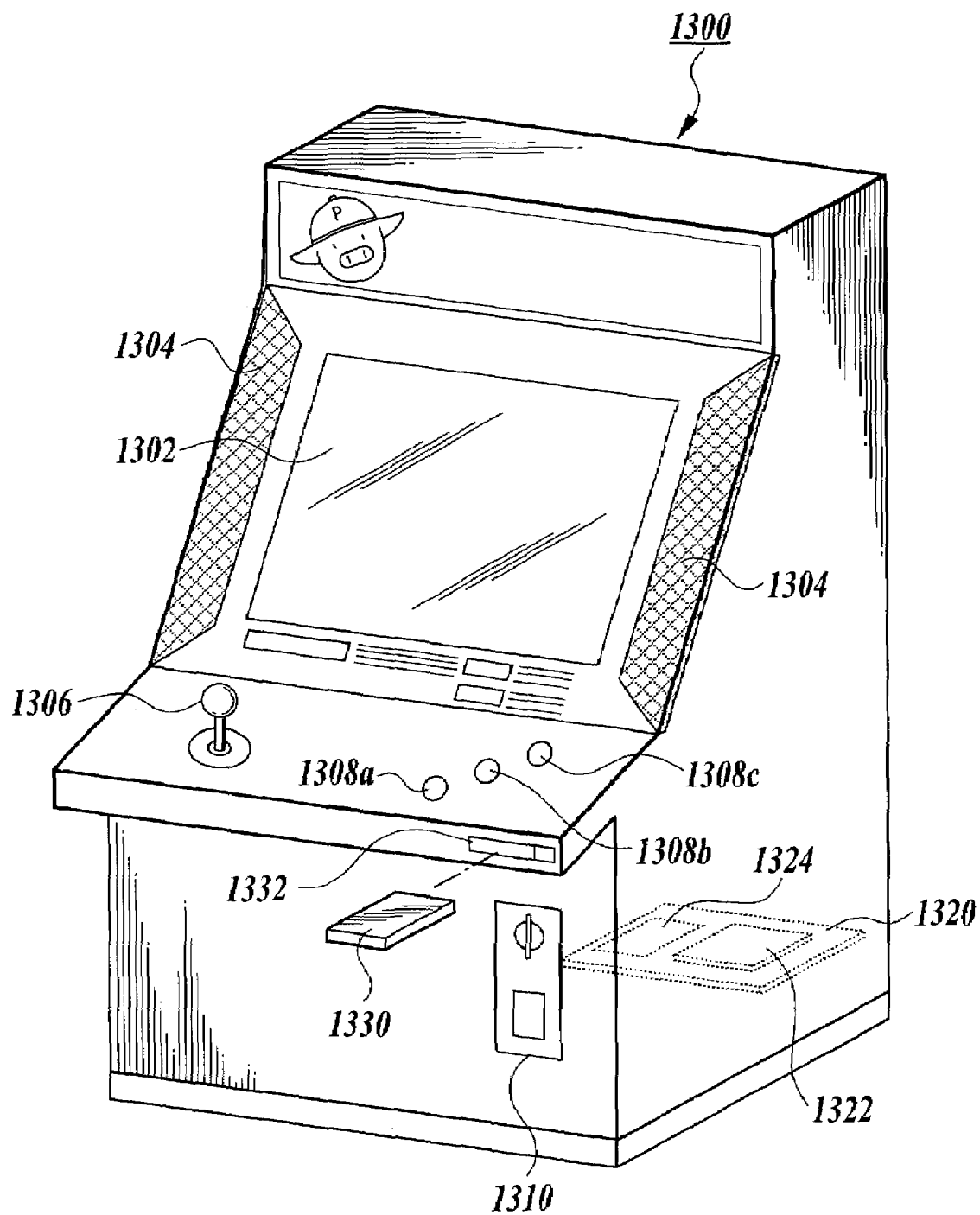
FIG. 1 is a view showing an example of an external appearance of an arcade game apparatus 1300 to which the present invention is applied.

FIG. 1 is a view showing an example of an external appearance of an arcade game apparatus 1300 to which the present invention is applied. As shown in FIG. 1, the arcade game apparatus 1300 comprises a display 1302 for displaying images of a game screen thereon, a speaker 1304 for outputting a game effective sound or a background music, a stick 1306 and a plurality of push buttons 1308 for inputting game operations, a coin insert unit 1310 in which a coin is inserted as a charge of a game play, and a control unit 1320 for performing operation processing to control the whole game apparatus 1300 so as to execute the versus fighting action game.

A plurality of types of push buttons 1308 are prepared. For example, A-type button 1308a, a B-type button 1308b and a C-type button 1308c are prepared. A technique "punch" is inputted by pushing the A-type button 1308a. A technique "kick" is inputted by the pushing the B-type button 1308b. A technique "guard" is inputted by pushing the C-type button 1308c. Also, in the same manner as the earlier development, in cases where a set of buttons 1308 are simultaneously pushed, a technique different from the above-described techniques can be performed in the game.

The control unit 1320 has a read only memory (ROM) 1322 for storing programs or data required to play the game, and an integrated circuit (IC) memory card 1324 attached to the control unit 1320 in detachable condition, for storing play data (also, called save data) of the game.

While a player watches game images displayed on the display 1302, the player inputs various types of game actions such as fighting techniques, a timing of the performance of the fighting technique, the movement of the character, manipulation of a menu or the like, by using the stick 1306 or the push buttons 1308, so that the player enjoys playing the game.

FIG. 2 is a view showing an example of a game screen in the versus fighting game. As shown in FIG. 2, the game screen in the versus fighting game includes a game stage 1, a player character 2, a CPU character 3, a power gauge 4, a time display 5, and a fighting result display 6 indicating a win or loss for every round. Fundamentally, like the versus fighting action game in the earlier development, the player character 2 operated by a player faces the CPU character 3 operated by the apparatus. Each character performs various types of fighting techniques against the other character to give a damage to the other character. A degree of the damage is indicated by the power gauge 4 placed at the upper right portion on the game screen. The character the damage of which exceeds a predetermined degree and the power gauge 4 of which reaches zero prior to another character loses the fighting game. Each game play is composed of a plurality of rounds performed within a predetermined game time. A remaining game time is displayed on the time display 5 placed at the upper central portion on the game screen. Finally, the player which wins more rounds is a winner in the game.

In this embodiment, an identification number display 8 is displayed. The identification number display 8 shows information for identifying the arcade game apparatus 1300 from the other game apparatuses. The identification number display 8 is, for example, composed of the combination of a color of a base portion 8a and an identification number 8b.

[Brief Explanation of Game]

Next, the game of the first embodiment will be explained in brief as follows.

In the first embodiment, the game is performed in (1) a conquest mode or (2) a versus fighting mode.

In the conquest mode, a plurality of powerful groups respectively composed of a plurality of players are formed in the game world, and each player can enjoy a group fighting in the game world. The player selects a favorite character from various characters, assigns and registers the character to any one of the powerful groups. Thereafter, when the player selects an opponent's powerful group, the player character can fight against a character which is assigned to the opponent's powerful group by another player. The strength of the powerful group is changed according to the result of the fighting game. That is, each player fights as one of group members against an opponent's player, and cooperates with other players belonging to the same powerful group. Therefore, the player can enjoy playing the game.

Further, when the player registers the character in the conquest mode, the character is registered with information relating to the tendency of actions inputted by the player. Also, an experience value of the character is increased or decreased according to the fighting result in the conquest mode, and thinking pattern information depending on the experience value is given to the character. The thinking pattern information indicates a thinking pattern when the character is controlled as the CPU character, and is called a thinking routine. In cases where the registered character fights as the CPU character against an opponent, the registered character is operated on the basis of the thinking pattern information in consideration of the tendency of the actions inputted by the player. Accordingly, even though the player does not operate the character at that time, the character fights against an opponent by imitating a play style of the player. Thereafter, the experience value of the character is increased or decreased according to the fighting result. As a result, the thinking pattern of the character could be strengthened or weakened. Accordingly, the player can entertain the new game property that the registered character may become stronger or weaker by fighting as the CPU character against the other player character while being controller by the player.

In the versus fighting mode, the player character fights against the CPU character like the earlier development. In this embodiment, the character registered in the conquest mode can also be used as the CPU character. The experience value of the registered character is changed according to the fighting result in the versus fighting mode. Accordingly, the player can strengthen the character registered by the player by making the registered character fight against a character selected by the player.

[Explanation of Functional Blocks]

Figure 3B:
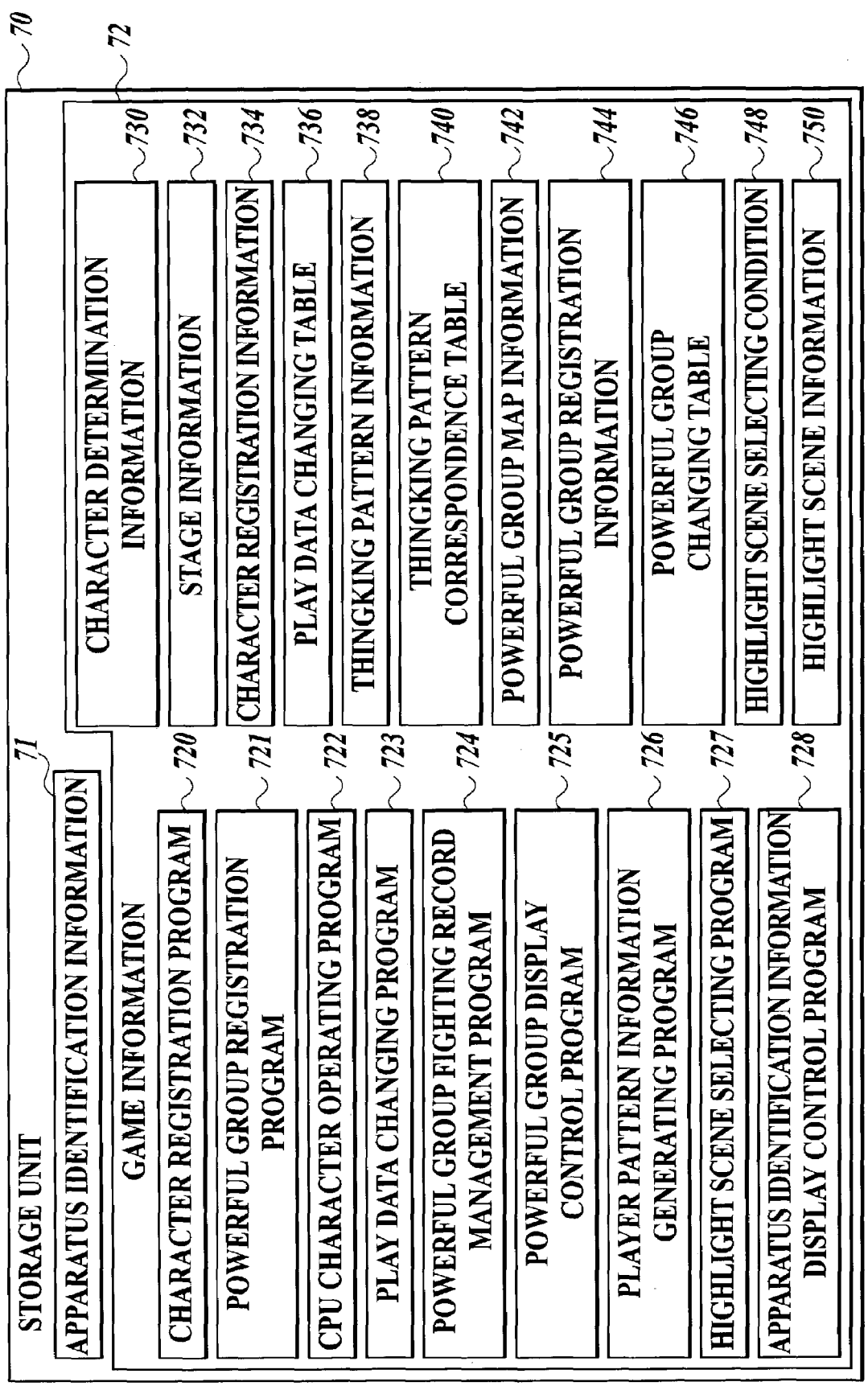

FIGS. 3A and 3B are block diagrams showing an example of a functional structure of the arcade game apparatus 1300 according to the first embodiment of the present invention. As shown in FIGS. 3A and 3B, the arcade game apparatus 1300 comprises an operation input unit 10, a processing unit 20, a display unit 30, a sound output unit 40 and a storage unit 70.

The operation input unit 10 is, for example, formed of a cross key, a lever, button switches, a joy stick or the like. When the player inputs various game operations through the operation input unit 10, the operation input unit 10 outputs the inputted operation signal to the processing unit 20. In the example shown in FIG. 1, the stick 1306 and the push buttons 1308 correspond to the operation input unit 10.

The processing unit 20 controls the whole arcade game apparatus 1300, sends an instruction to each functional block of the arcade game apparatus 1300 and performs various types of operation processing such as the game operation or the like. The function of the processing unit 20 is realized by a hardware such as a CPU (CISC (complex instruction set computer) type or RISC (reduced instruction set computer) type), an ASIC (application specified IC) (a gate array or the like) or the like, a related control program or the like. In the example shown in FIG. 1, the control unit 1320 corresponds to the processing unit 20.

The processing unit 20 comprises a game operating unit 22 for performing the operation processing relating to the game, an image generating unit 24 for generating an image signal from various types of data obtained by the operation processing performed by the game operation unit 22, and a sound generating unit 26 for generating a sound signal indicating a game sound such as an effective sound or a background music.

The game operating unit 22 performs various types of game processing according to the operation signals inputted through the operation input unit 10, or programs or data read out of the storage unit 70. For example, the game operating unit 22 performs a processing for setting a virtual space, for arranging and moving objects in the virtual space, for determines hits, for controlling actions of characters, for obtaining game results, for determining a position of a view point or an eyes direction or the like, as the game processing.

The game operating unit 22 comprises a character registration unit 220, a powerful group registration unit 221, a CPU character operating unit 222, a play data changing unit 223, a powerful group fighting record management unit 224, a powerful group display control unit 225, a player pattern information generating unit 226, a highlight scene selecting unit 227 and an apparatus identification information display control unit 228.

The character registration unit 220 registers and manages play data, a password or the like for each character. The play data represents information on a state of the game play which will be described later in detail.

The play data changing unit 223 changes the play data of the player character and the play data of the CPU character according to the fighting result. For example, the play data changing unit 223 increases or decreases the experience value according to the pattern of win or loss. When the experience value satisfies a predetermined condition, the play data changing unit 223 changes the level of the character up.

The CPU character operating unit 222 select any one of characters registered in the character registration unit 220, and controls the character as the CPU character. In this embodiment, the CPU character operating unit 222 controls the selected character according to the play data related to the character.

The powerful group registration unit 221 determines a plurality of powerful groups in the game world, and manages each character registered in the character registration unit 220 by assigning the character to any one of the powerful groups or unfixed.

The powerful group fighting record management unit 224 manages the fighting record of each powerful group registered in the powerful group registration unit 221. The powerful group fighting record management unit 224 changes the fighting record of the powerful group to which the player character belongs and the fighting record of the powerful group to which the CPU character belongs, according to the fighting result of the player character and the CPU character.

Figure 20A:
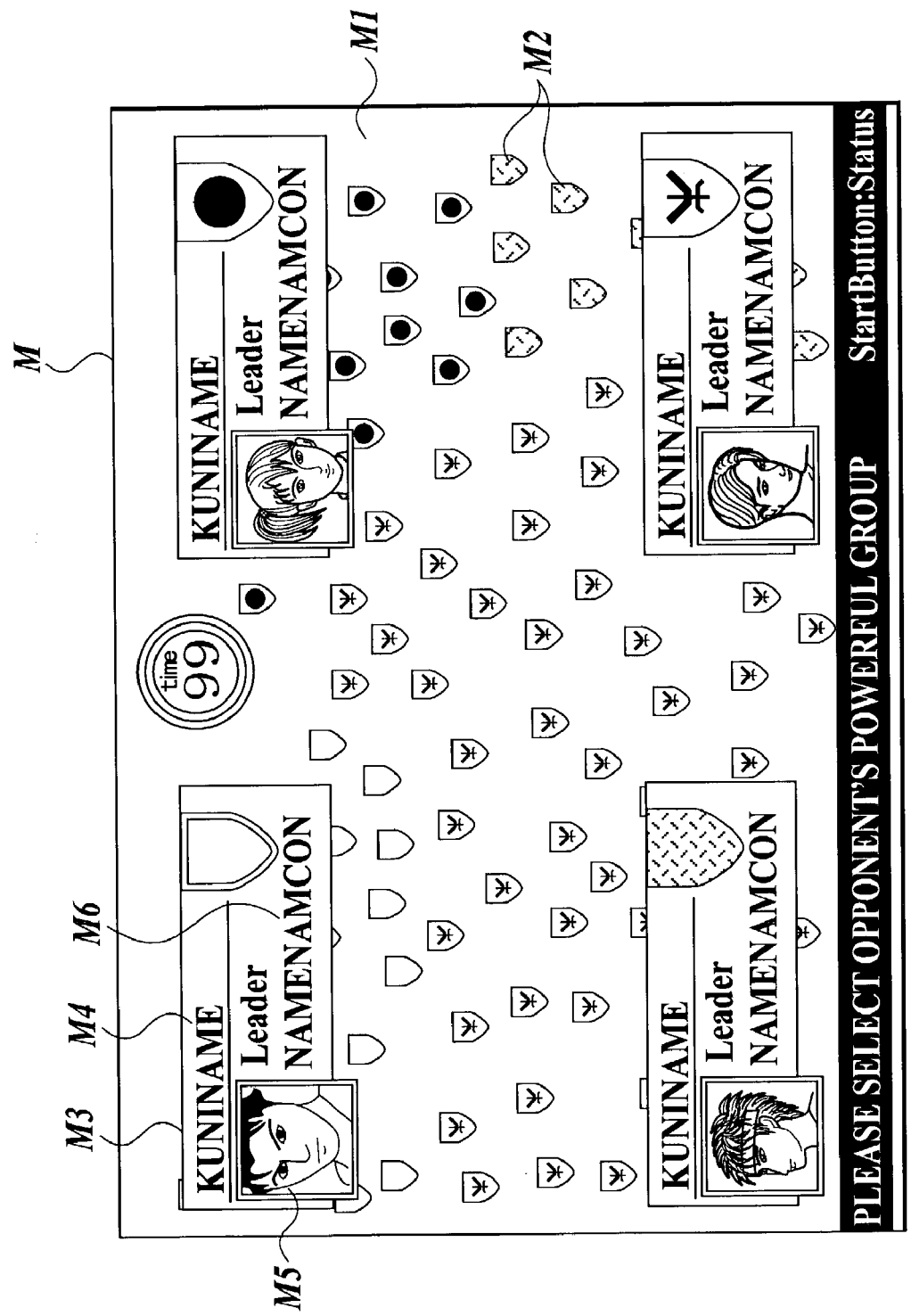
FIGS. 20A and 20B are views showing examples of the display screen of the powerful group map M on which the fighting result is reflected.
Figure 20B:
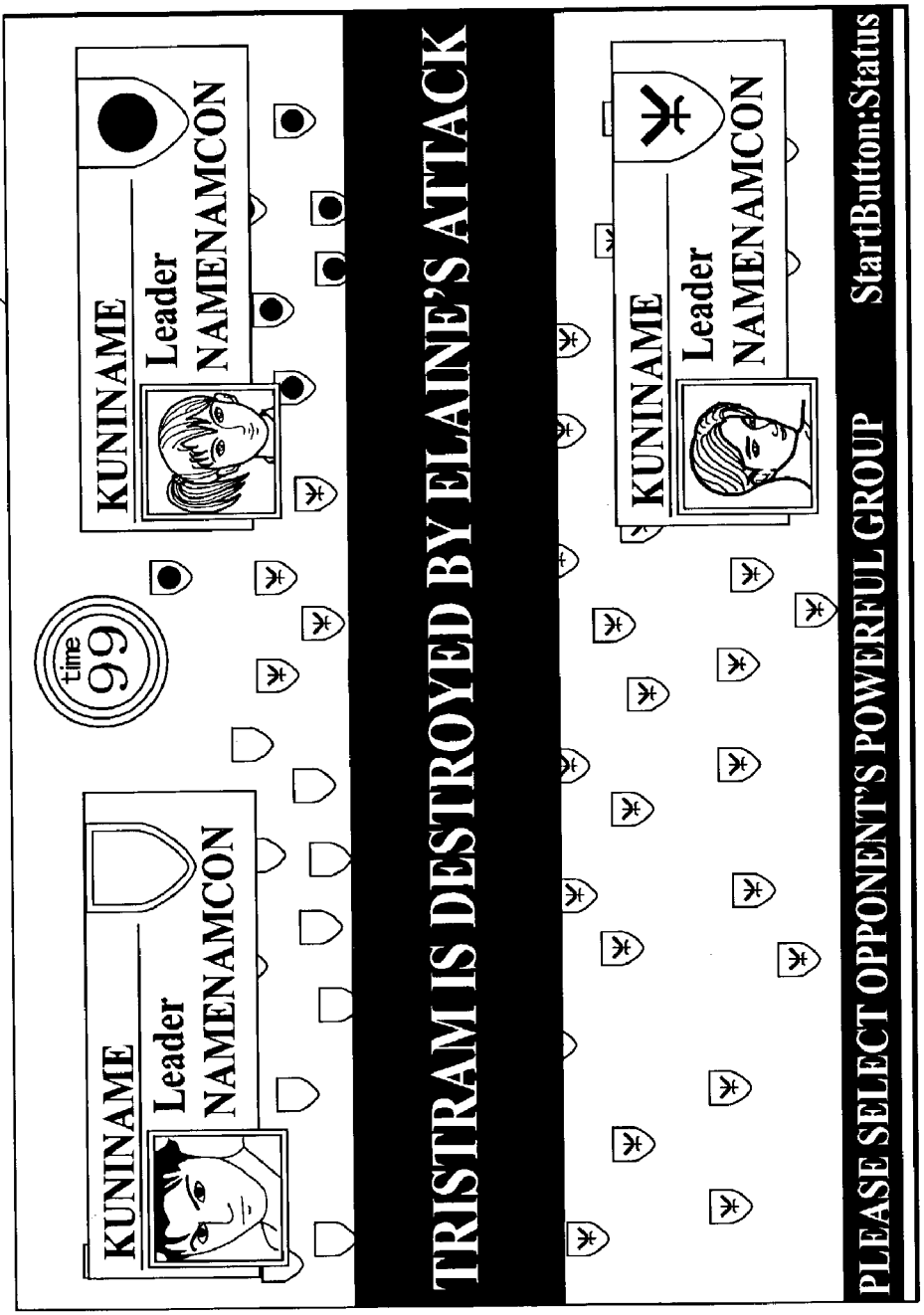

The powerful group display control unit 225 displays a powerful groups map indicating a state of a strength distribution of the powerful groups. FIGS. 20A and 20B are views showing examples of screens of the powerful groups map. As shown in FIG. 20A and FIG. 20B, the powerful groups map M includes a background M1, power group flags M2 and a power group label M3. The background M1 is an image imitating a map. Each power group flag M2 is a mark that represents a fighting troop or a camp and has a color peculiar to the powerful group. Therefore, the player can judge a win-loss state of the fighting according to the arrangement of the power group flags M2. The power group label M3 shows information on a representative of each powerful group. For example, in the each power group label M3, a name M4 of the powerful group, a character image M5 of a leader of the powerful group and a character name M6 of the leader are displayed.

The player pattern information generating unit 226 generates information on the tendency (or the pattern) of actions of the player character inputted by the player.

The highlight scene selecting unit 227 determines that a highlight scene is required in the fighting when the fighting result satisfies a prescribed condition. The highlight scene selecting unit 227 generates information so as to generate the scene within a predetermined time period before and after the scene of wining or losing the fighting, and stores it in the storage unit 70.

The apparatus identification information display control unit 228 displays the information required to identify the arcade game apparatus 1300, for example, the identification number display 8. In this embodiment, as described later, registration information of characters is stored in the storage unit 70. Therefore, when the arrangement of the arcade game apparatus 1300 is changed in a game amusement place, there is a possibility that the player cannot identify the apparatus in which the character is registered. However, because the apparatus identification information display control unit 228 displays the identification number display 8 on the display, it is possible to avoid the problem as described above.

The display unit 30 displays the game screen on the basis of the image signal generated by the image generating unit 24, thereon. The display unit 30 is realized by a hardware such as a CRT (cathode-ray tube), a LCD (liquid crystal display), an ELD (electronic luminescence display), a PDP (plasma display panel), a HMD (head mount display) or the like. In the example shown in FIG. 1, the display 1302 corresponds to the display unit 30.

The sound output unit 40 outputs an effective sound, a background music or the like generated by the sound generating unit 40, therefrom. In the example shown in FIG. 1, the speaker 1304 corresponds to the sound output unit 40.

The storage unit 70 is realized by an information storage medium such as an IC memory, a hard disk, an IC memory card or the like. The storage unit 70 stores a system program used to control the arcade game apparatus 1300 or game data (for example, the fighting result for each round) required for the operation processing, apparatus identification information 71 and game information 72 including data such as a program, determined values or the like for executing the versus fighting action game.

The apparatus identification information 71 is information required to identify the arcade game apparatus 1300, for example, preferably, a plate number of the control unit 1320. The apparatus identification information display control unit 228 determines and controls the color of the base portion 8a and the identification number 8b of the identification number display 8 on the basis of the apparatus identification information 71.

The game information 72 includes, as a program, a character registration program 720 used for making the character registration unit 220 function in the processing unit 20, a powerful group registration program 721 used for making the powerful group registration unit 221 function, a CPU character operating program 722 used for making the CPU character operating unit 222 function, a play data changing program 723 used for making the play data changing unit 223 function, a powerful group fighting record management program 724 used for making the powerful group fighting record management unit 224 function, a powerful group display control program 725 used for making the powerful group display control unit 225 function, a player pattern information generating program 726 used for making the player pattern information generating unit 226 function, a highlight scene selecting program 727 used for making the highlight scene selecting unit 227 function, and an apparatus identification information display control program 728 used for making the apparatus identification information display control unit 228 function.

The game information 71 includes, as data, character determination information 730, stage information 732, character registration information 734, a play data changing table 736, thinking pattern information 738, a thinking pattern correspondence table 740, powerful group map information 742, powerful group registration information 744, a power group changing table 746, a highlight scene selecting condition 748 and highlight scene information 750.

The character determination information 730 includes determined data of each character usable for a player in the versus fighting game. For example, the character determination information 730 includes modeling data, texture data, basic parameters and action data of fighting techniques for each character.

The stage information 732 includes data used for displaying the game stage 1 (refer to FIG. 2) of the versus fighting game on the display. For example, the stage information 732 includes a background image of the stage, modeling data of objects arranged on the stage, display data for the power gauge 4 or the time display 5 and so on.

Figure 4:
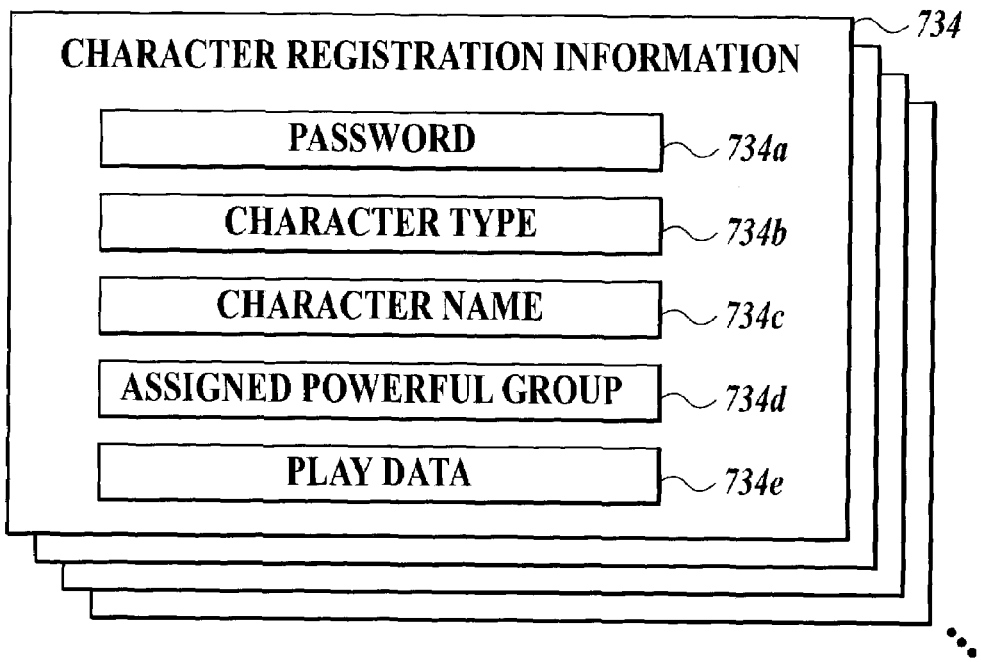
FIG. 4 is a view showing an example of a data structure of character registration information 734.

The character registration information 734 indicates registration information of each character used by the player for the game play. FIG. 4 is a view showing an example of the data structure of the character registration information 734. As shown in FIG. 4, the character registration information 734 includes a password 734a used as identification information, a character type 734b, a character name 734c, an assigned powerful group 734d and play data 734e.

The character type 734b denotes the used character of the characters determined by the character determination information 730, and corresponds to the character determination information 730. The character name 734c denotes information indicating a name of the character determined by the player at the registration. The assigned powerful group 734d denotes the powerful group to which the character is assigned of the powerful groups including unfixed assigned by the assigning powerful group 734d.

Figure 5:
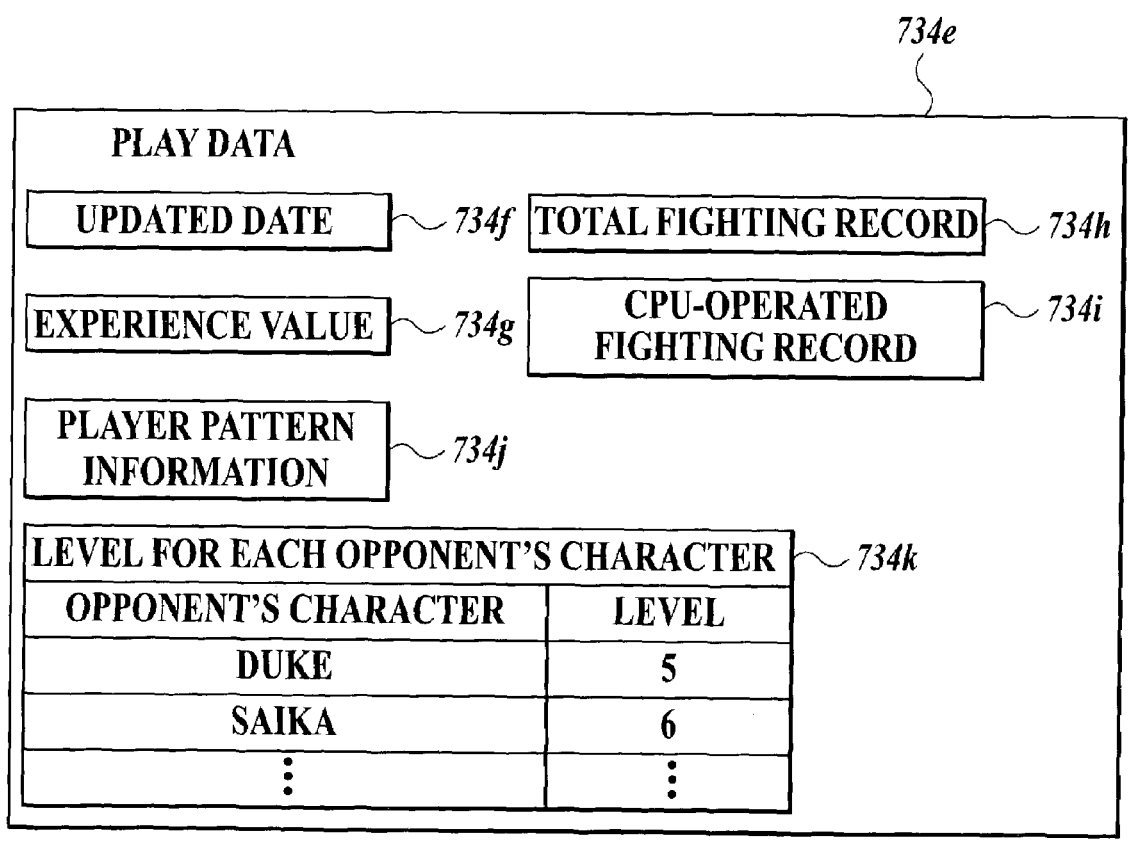
FIG. 5 is a view showing an example of a data structure of play data 734e.

FIG. 5 is a view showing an example of the data structure of the play data 734e. As shown in FIG. 5, the play data 734e includes an updated date 734f, an experience value 734g, a total fighting record 734h, a CPU-operated fighting record 734i, player pattern information 734j and a level table 734k for each opponent's character.

The updated date 734f includes information indicating a latest date when the player plays the fighting game, and renewed each time the player plays the fighting game. The experience value 734g includes a parameter indicating a degree of the experience of the fighting, and changed by the play data changing unit 223 according to the fighting result as usual. The total fighting record 734h includes information indicating a fighting record which is determined by all results of the fighting game performed after the registration of the character, for example, the number of wins and losses, the percentage of wins, a maximum time period, a minimum time period or an average time period of the fighting game and so on. The CPU-operated fighting record 734i includes information indicating a record of the fighting when the character is operated as the CPU character. The player pattern information 734j includes information indicating the tendency of the actions inputted by the player.

FIG. 6 is a view showing an example of the data structure of the player pattern information 734j. As shown in FIG. 6, the player pattern information 734j includes data indicating the tendency of action inputted by the player for every type classified into elements of "attack", "defense" and "movement". In detail, the element of "attack" is classified into, for example, techniques of "punch", "kick" and "specific attack A", and the number of inputs and the input frequency are stored for each technique. In case of inputting the technique of "punch" through the A-button 1308a, the player pattern information generating unit 226 increments the number of inputs of the technique "punch", and renews the input frequency of the technique "punch". Similarly, in case of inputting the technique "kick" through the B-button 1308b or the technique "specific attack A" through the simultaneous pressing of the A-button 1308a and the B-button 1308b, the above-described processing for the technique "kick" or "specific attack A" is performed, respectively. FIG. 6 shows that the input frequency of the technique "kick" of the attack is high, and the player using the character has the tendency to frequently use the technique "kick".

The level table 734k for each opponent's character stores the level of the character in fighting against each opponent's character therein. For example, the level means that the player character is richer in experience of fighting against the corresponding opponent's character and stronger in it. In contrast, the level means that the player character is weaker in fighting against the opponent's character as the level is lower. The level is set by the play data changing unit 223 according to the experience value 734g.

The play data change table 736 includes information for determining the degree of the change in the play data according to the fighting result, and referred by the play data changing unit 223.

The thinking pattern information 738 stores information called the thinking pattern or the thinking routine which is referred by the CPU character control operation unit 222 when the CPU character operating unit 222 controls the CPU character. For example, the CPU character operating unit 222 selects the element of "attack", "defense" and "movement", selects the fighting technique of the selected element, and determines the timing of the selected fighting technique, in response to the action of the opponent character inputted by the player, with reference to the thinking pattern information 738. Also, in the thinking pattern information 738, a plurality of levels of strength such as "easy", "normal", "hard", "very hard" and "ultra-hard" are prepared in advance.

The thinking pattern correspondence table 740 is prepared for each character, and defines the type of the thinking pattern information 738 corresponding to the level table 734k for each opponent's character.

FIG. 7 is a view showing an example of the data structure of the thinking pattern correspondence table 740. As shown in FIG. 7, the thinking pattern correspondence table 740 is prepared for each remarked character 740a used as a CPU character. The thinking pattern correspondence table 740 defines the thinking pattern information 738 as a matrix of the opponent's character 740c and the level range 740b corresponding to the level table 734k (refer to FIG. 5). For example, in the case shown in FIG. 7, when the level corresponding to the character name "Saika" stored in the level table 734k is 6, the CPU character operating unit 222 controls the character with reference to the thinking pattern information 738 of the strength "normal 1".

The powerful groups map information 742 includes information of an initial map for displaying the powerful group map M (refer to FIG. 20A or FIG. 20B) on the game screen. The powerful group display control unit 225 changes the initial map of the powerful groups map information 742 according to the powerful group registration information 744, and displays it on the screen.

The powerful group registration information 744 includes information indicating the degree of the strength of each powerful group.

FIG. 8 is a view showing an example of the data structure of the powerful group registration information 744. As shown in FIG. 8, the powerful group registration information 744 is prepared for each powerful group, and includes a powerful group number 744a as identification information, the number of characters 744b assigned to the powerful group, a control ratio 744c, a powerful group's fighting record 744d indicating all fighting results of the powerful group, a leader character 744e indicating a leader of the characters assigned to the powerful group and an assigned character table 744f.

The control ratio 744c is used as an index of the ability of the powerful group. In cases where the control ratio 744c is lowered to 0%, the powerful group registration unit 221 judges that the powerful group is attacked and destroyed, and deletes the registration of the powerful group. When the registration of a powerful group is deleted, the assigned powerful group 734d (refer to FIG. 4) of each character assigned to the powerful group is set to a non-fixed state indication that the character is not assigned to any powerful group.

The assigned character table 744f includes, for example, a password, a character name, a fighting record and a level for each character assigned to the powerful group in order of the ranking of the characters. The ranking is determined, for example, according to the fighting record and level, to indicate the order of the strength of the characters in the powerful group. The assigned character table 744f includes a predetermined maximum number. In cases where a new character is assigned to the powerful group having the maximum number of characters, the powerful group registration unit 221 deletes one character assigned to the powerful group that satisfies a predetermined condition, and registers the new character in the powerful group.

The powerful group strength changing table 746 includes information for defining contents used for changing the powerful group registration information 744, particularly to change the control ratio 744c, and referred by the powerful group fighting record management unit 224.

FIG. 9 is a view showing an example of the data structure of the power group changing table 746. The control ratio 744c shown in FIG. 8 is changed according to elements of a win-loss pattern, elements of successive wins and elements of successive losses. In detail, for example, in case of "perfect win" in which the character defeats the opponent's character without receiving any damage from the opponent's character, the control ratio 744c is increased by +0.10 according to the number of perfect wins. Also, in case of "successive wins", the control ratio 744c is increased according to the number of wins in the successive wins. Conversely, in case of "successive losses", the control ratio 744c is decreased according to the number of losses in the successive losses.

The highlight scene selecting condition 748 including information for defining conditions of the fighting including the highlight scene, and referred by the highlight scene selecting unit 227.

FIG. 10 is a view showing an example of the data structure of the highlight scene selecting condition 748. As shown in FIG. 10, for example, in cases where the powerful group of the opponent's character disappears as the fighting result (Condition-1), or in cases where the ten successive combos succeeds (Condition-2), the highlight scene selecting unit 227 acknowledges that the fighting includes the highlight scene.

The highlight scene information 750 is stored so that the highlight scene selecting unit 227 replays the highlight scene. To select the highlight scene and generate and store the highlight scene information 750 can be performed according to an earlier developed technique for displaying a replay image.

[Explanation of Processing Flow]

Next, the detailed flow of the processing according to the first embodiment, will be explained with reference to FIG. 11A to FIG. 23B.

Figure 11A:
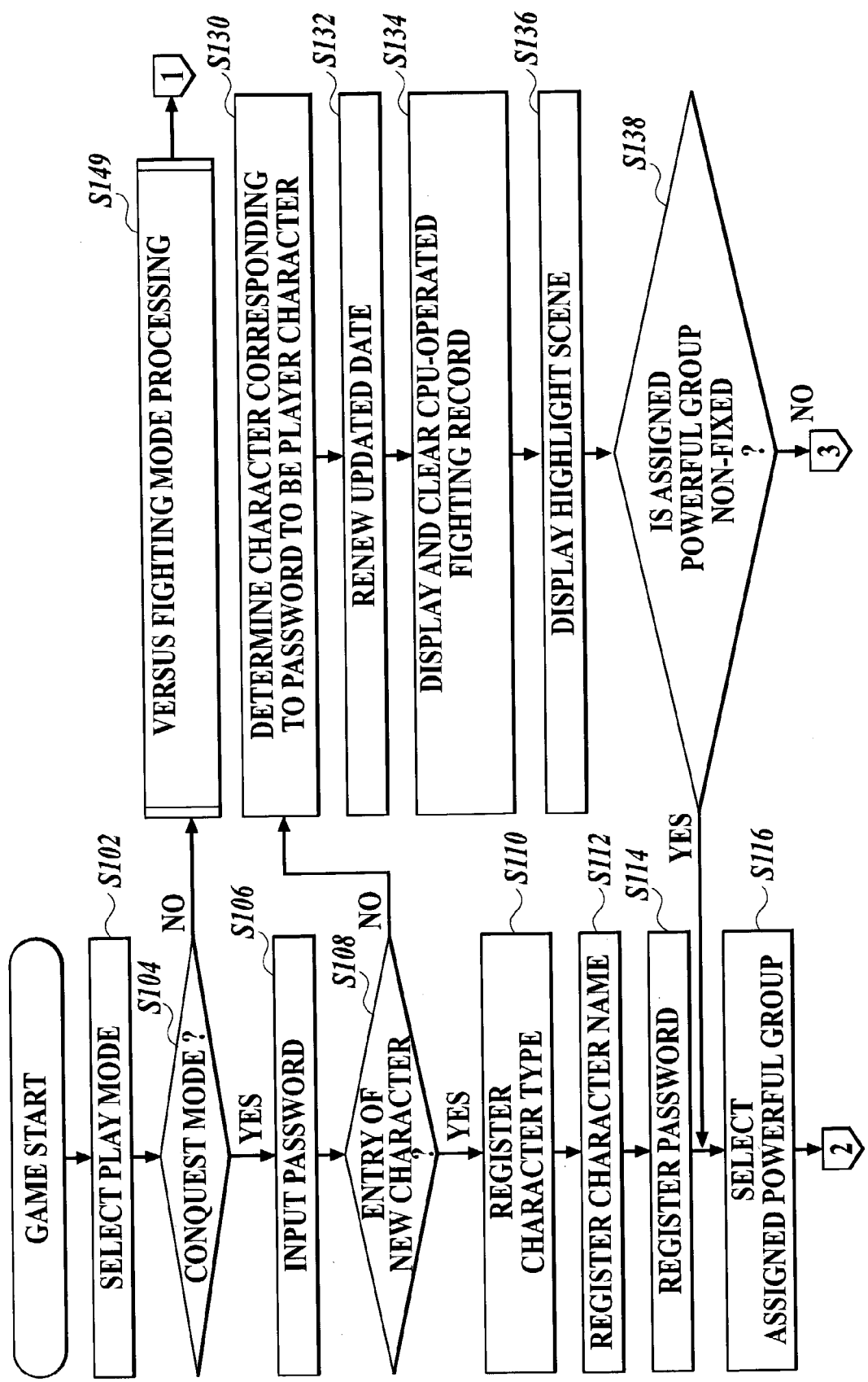
FIGS. 11A and 11B are flow charts for explaining a flow of a main processing according to the first embodiment.
Figure 11B:
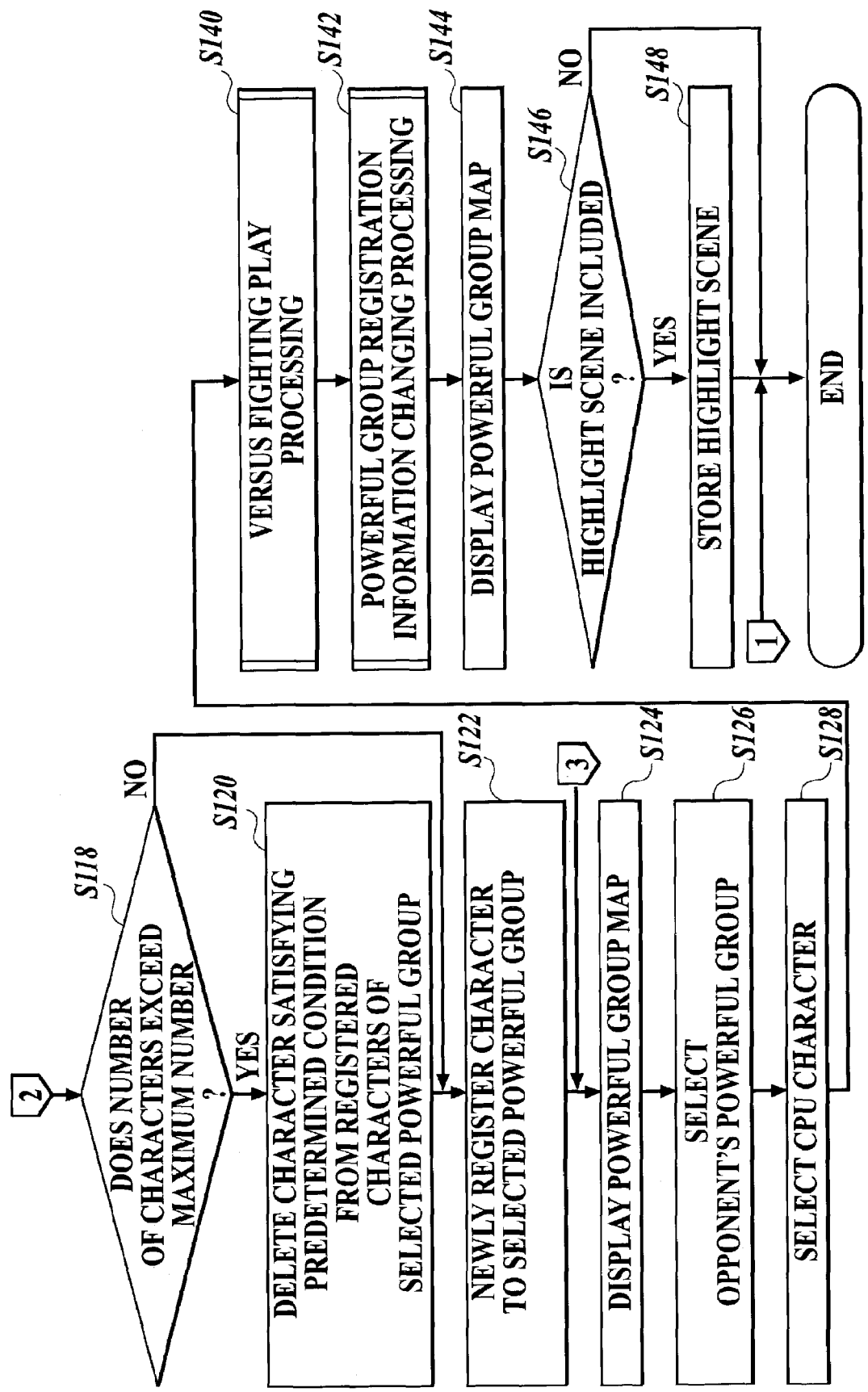

FIG. 11A and FIG. 11B are flow chart for explaining the main processing according to the first embodiment of the present invention. As shown in FIG. 11A and FIG. 11B, the game operating unit 22 displays the play mode selecting screen on the display unit 30 (Step S102). A player can select any one of the versus fighting mode and the conquest mode on the play mode selecting screen by the stick 1306.

When the conquest mode is selected in Step S102, (Step S104; YES), the game operation unit 22 displays a password input screen on the display unit 30 so that the player inputs the password (Step S106). Herein, the inputted password denotes the password 734a used for identifying the character registration information 734. The player can select the entry of a new character or the inputting of the registered password of the player on the password input screen. In order to play in the conquest mode, the player selects the entry of a new character.

Figure 16:
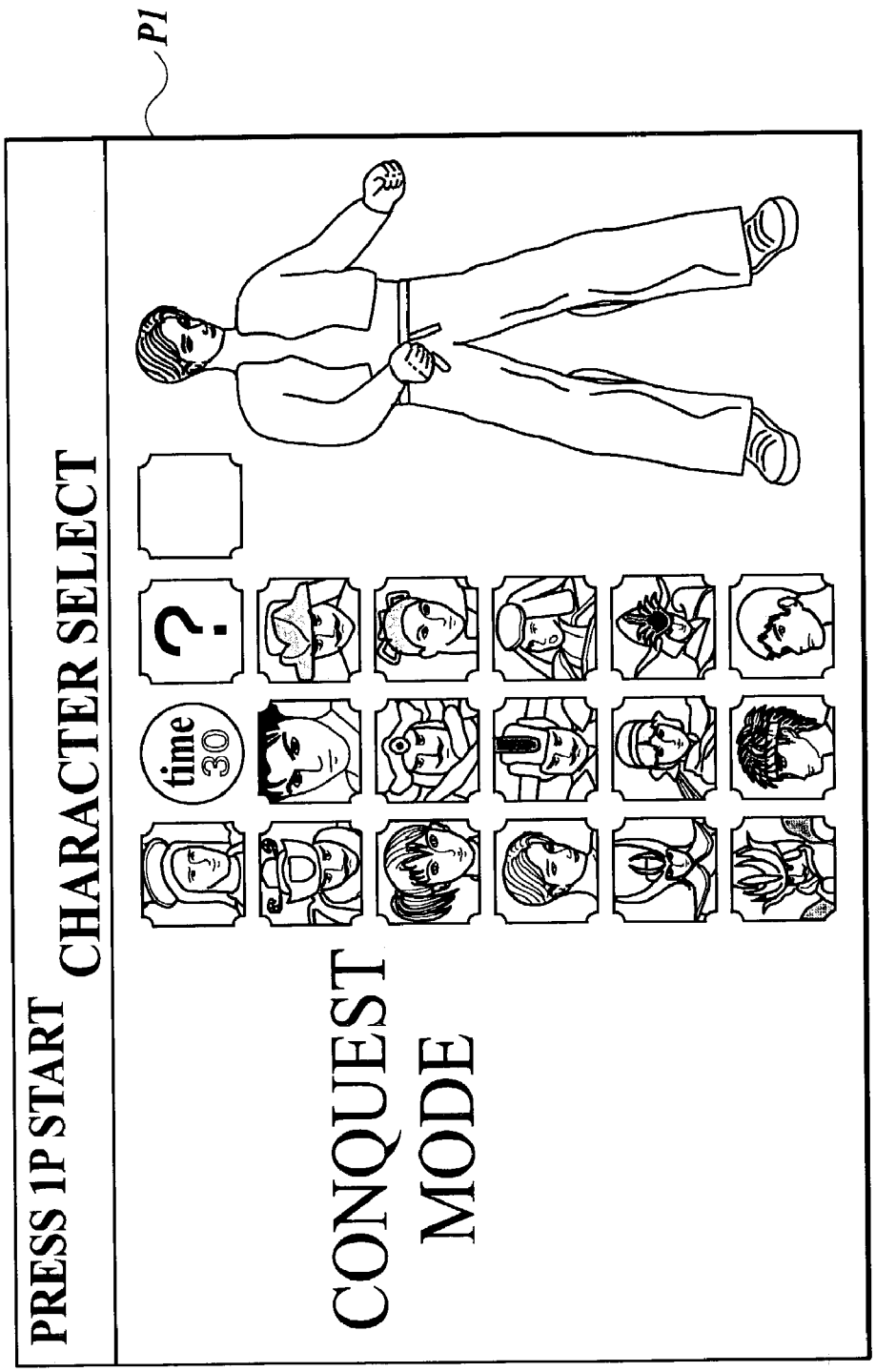
FIG. 16 is a view showing an example of a character selecting screen.

When the player selects the entry of a new character on the password input screen (Step S108; YES), the character registration unit 220 generates a new character registration information 734 and registers a character type 734b at first (step S110). More specifically, the character registration unit 220 displays, for example, a character selecting screen P1 as shown in FIG. 16, to make the player select the character type.

Figure 17:
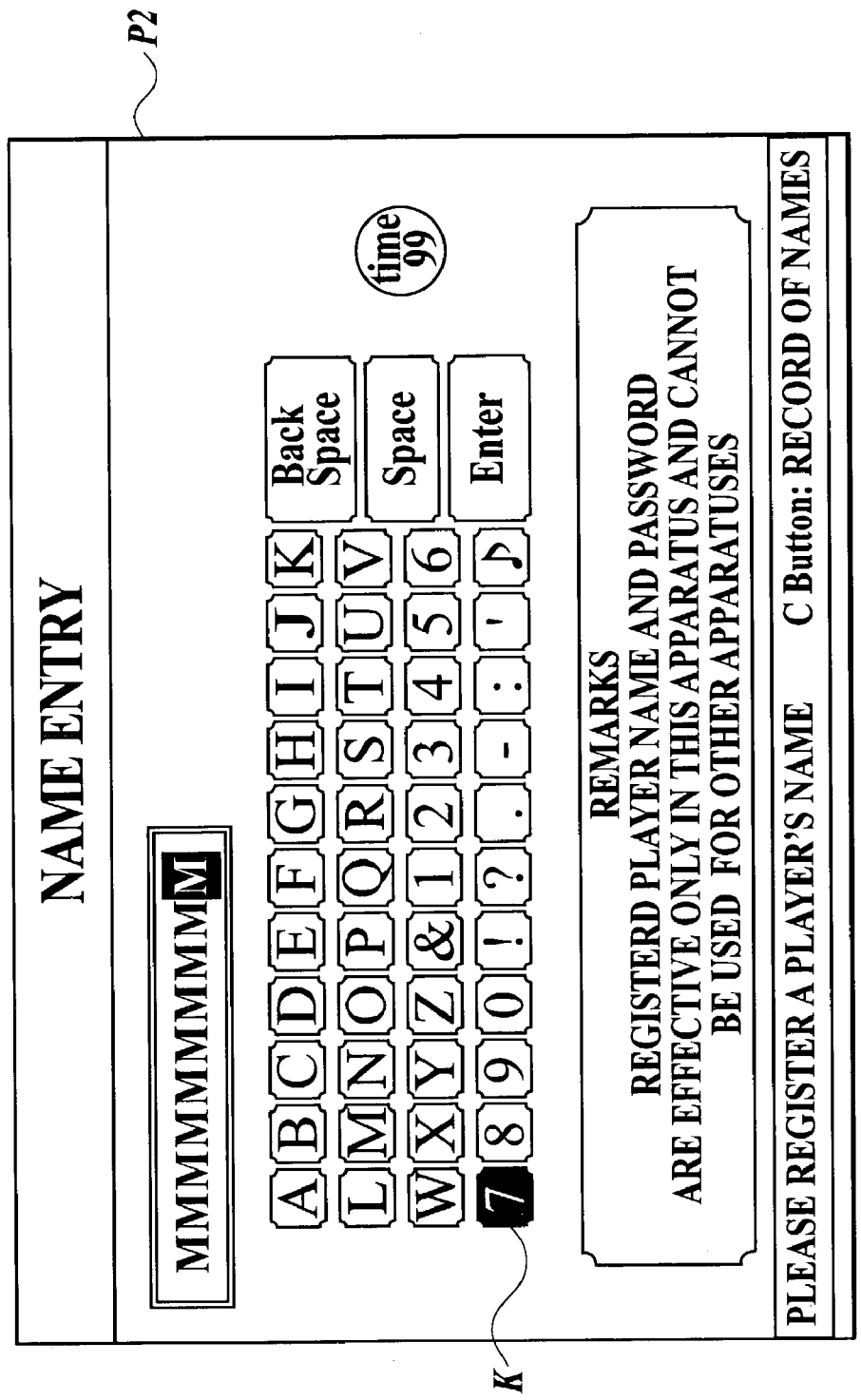
FIG. 17 is a view showing an example of a character name input screen.

Then, the character registration unit 220 registers the character name 734c of the selected character (Step S112), and the password 734a (Step S114). For example, in order to register the character name and the password, the character registration unit 220 displays a name entry screen P2 with a soft keyboard K as shown in FIG. 17, to make the player input the character name and the password.

Thereafter, the assigned powerful group is registered (step S116). The powerful group display control unit 225 displays the powerful group map M on the display unit 30 to make the player recognize the current state of the powerful groups and select any one powerful group to which the player wants to belong. Assigned After the powerful group is selected, the powerful group registration unit 221 determines whether the number of characters assigned to the selected powerful group exceeds the maximum number with reference to the powerful group registration information 744 (Step S118). When number of characters assigned to the selected powerful group exceeds the maximum number (Step S118; YES), the powerful group registration unit 221 deletes the registration of the character which satisfies the predetermined condition (step S120), and registers the selected character to the selected powerful group (Step S122). Here, the predetermined condition can be determined based on the registration order. According to the embodiment, the predetermined condition is determined so as to delete the character having a longest time period from the updated date 734f to the current date.

Thereafter, the character registration unit 220 changes the assigned powerful group 734d (refer to FIG. 4) of the character the registration of which is deleted by the powerful group registration unit 221, to the unregistered state, and changes the assigned powerful group 734d of the newly registered character to information of the selected powerful group.

When the player inputs the registered password in Step S106 (Step S108; NO), the game operation unit 22 determines a player character according to the character registration information 734 corresponding to the registered password (Step S130), and renews the updated date 734f (step S132).

Figure 18:
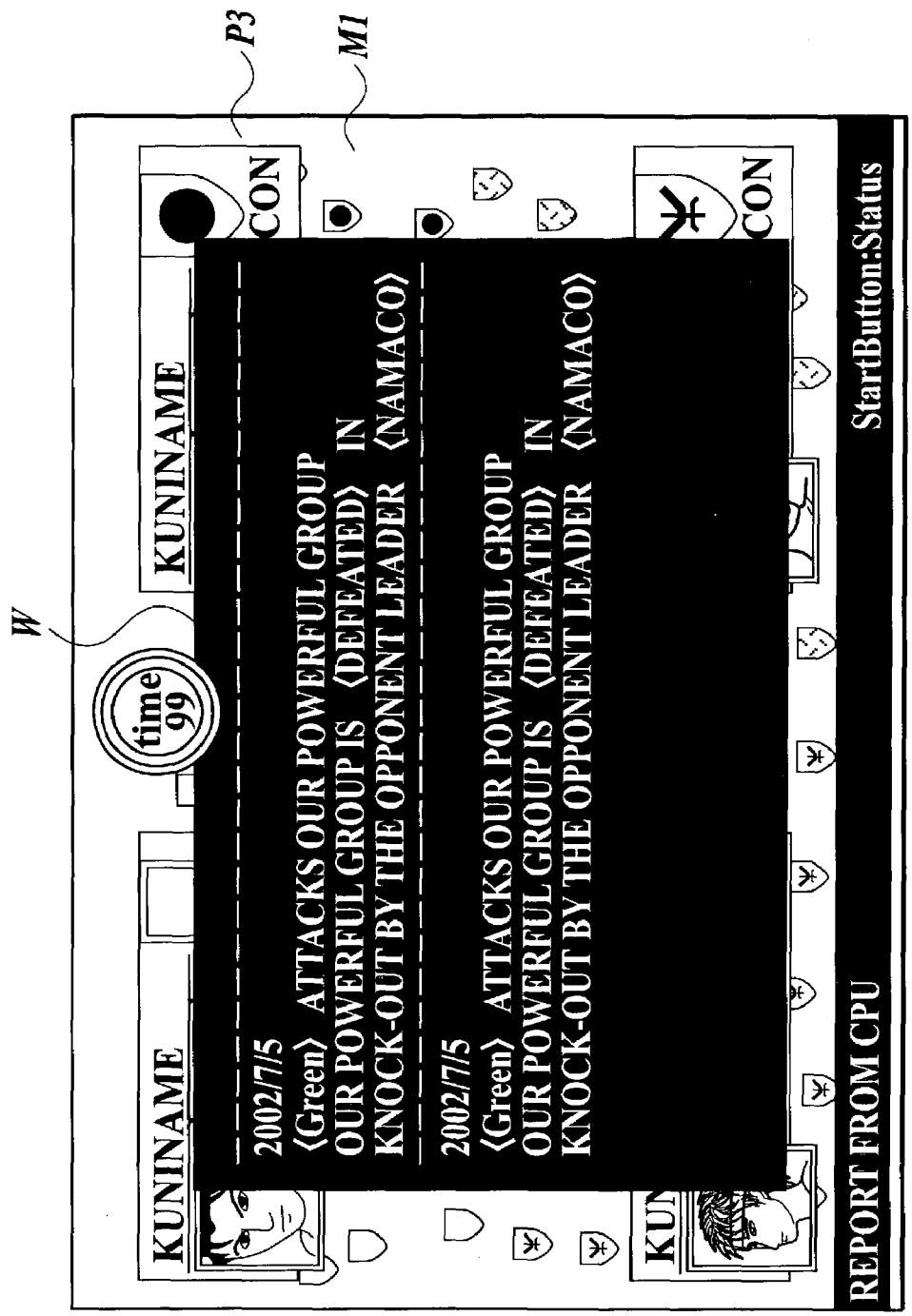
FIG. 18 is a view showing an example of a display screen of a CPU-operated fighting record.

Thereafter, the game operation unit 22 displays the CPU-operated fighting record 734i on the display unit 30 to inform the player of the CPU-operated fighting record, and clears the CPU-operated fighting record (step S134). FIG. 18 is a view showing an example of the screen of the CPU-operated fighting record 734i. As shown in FIG. 18, for example, a window W is displayed on the background image M1 of the powerful groups map M to display the text of the CPU-operated fighting record 734i.

Then, the game operation unit 22 displays the highlight scene on the display unit 30 (step S136). For example, a time-series list of highlight scenes is displayed so that the player any one of the highlight scenes to be displayed as the occasion may demand.

Thereafter, the gate operating unit 22 refers the assigning powerful group 734d. When the registration of the player character in the assigned powerful group is deleted while the player does not play, the player character is set to the non-fixed state. When the assigned powerful group 734d of the player character is not fixed (Step S138; YES), the game operation unit 22 goes to Step S116, and newly determines the assigned powerful group of the player character (Steps S116 to S122).

When the assigned powerful group is determined, the opponent's powerful group is selected.

Figure 19:
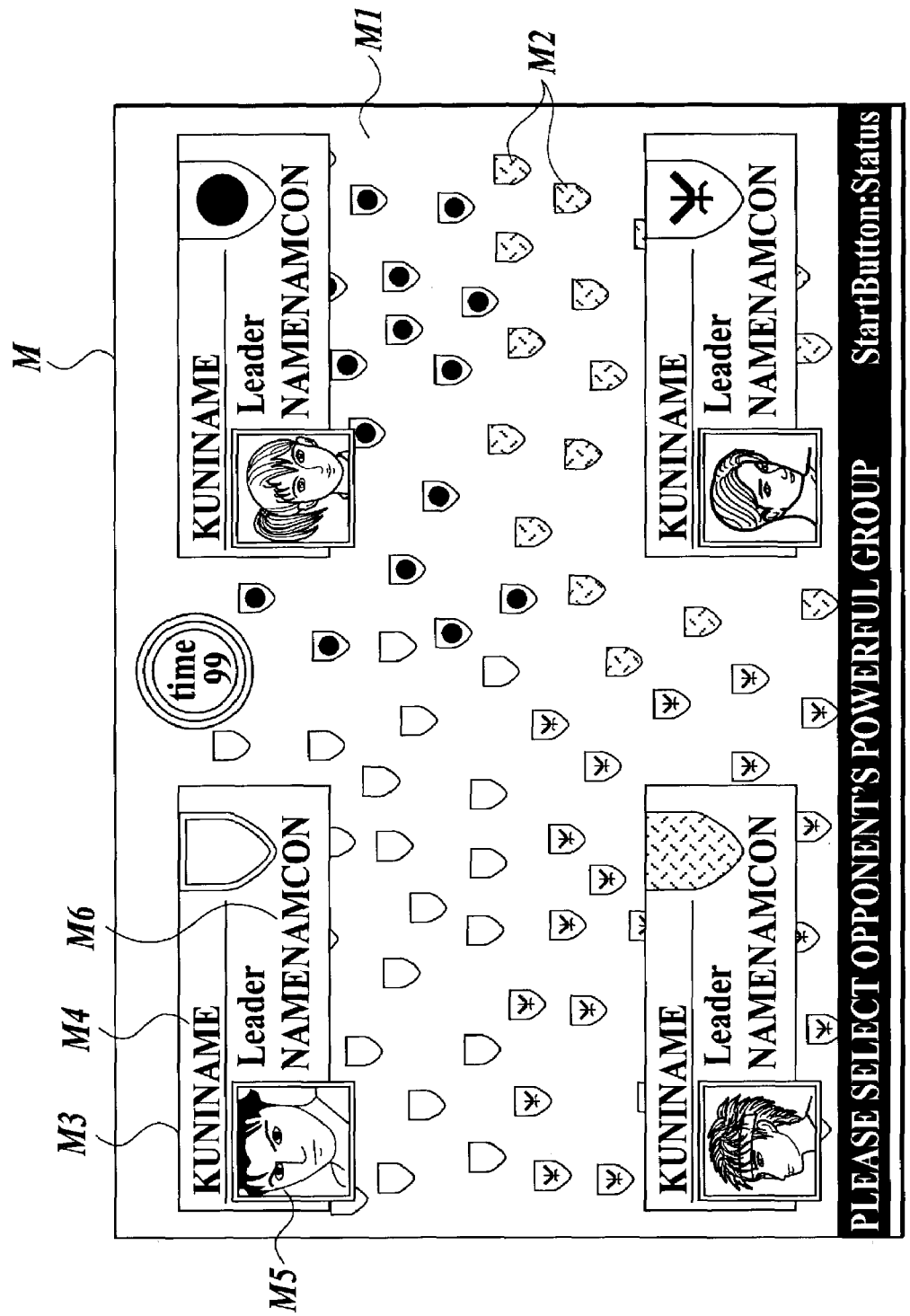
FIG. 19 is a view showing an example of a display screen of a powerful group map M.

In detail, the powerful group display control unit 225 displays the powerful group map M on the display unit 30 (Step S124). The player selects the opponent's powerful group from the displayed powerful group map M (Step S126). FIG. 19 is a view showing an example of the screen of the powerful group map M. The powerful group label M3 of the powerful group selected by the player is displayed by a specific color different from those of the power group labels M3 of the other powerful groups, or distinguished from the other powerful groups by a predetermined mark.

When the opponent's powerful group is selected, the CPU character operating unit 222 any one of characters assigned to the opponent's powerful group, and determines it to be the CPU character (step S128). More specifically, the CPU character operating unit 222 selects a character having the same level as or the similar level to that of the player character, from characters registered in the assigned character table 744f with reference to the powerful group registration information 744. The number of characters selected as the CPU character may be determined as the occasion may demand. When a plurality of characters are selected as the CPU character, some of the characters may selected by the player.

When the CPU character is determined, the game operating unit 22 performs the versus fighting play processing (step S140).

FIG. 12A, FIG. 12B and FIG. 13 are flow charts for explaining the versus fighting processing according to the first embodiment.

The CPU character operating unit 222 obtains information required to operate the CPU character. In detail, the CPU character operating unit 222 obtains the level of the CPU character corresponding to the type of the player character from the level table 734k. Thereafter, the CPU character operating unit 222 selects and reads out the thinking pattern information 738 corresponding to both the level and the type of the player character with reference to the thinking pattern correspondence table 740 (Step S202). For example, when the player selects the character of "Saika", and the level of the CPU character corresponding to "Saika" is equal to 6 (refer to FIG. 5), the thinking pattern of "normal 1" is used (refer to FIG. 7).

Thereafter, the CPU character operating unit 222 read out the player pattern information 734j indicating the tendency of the actions inputted by the player who registers the character as the CPU character (step S204).

Then, a so-called verses fighting play processing is performed. This processing is composed of the operation control of the player character based on the operation of the player (dotted-line circle A) and the operation control of the CPU character (dotted-line circle B) which are alternately performed many times in a short cycle. Therefore, the player feels as if the player character and the CPU character were simultaneously controlled and operated.

First, the game operating unit 22 performs the operation control of the player character according to the operation of the player (dotted-line circle A). In detail, when the game operating unit 22 determines whether the operation is inputted through the operation input unit 10 (step S206). When the operation is inputted (Step S2061; YES), the game operating unit 22 determines whether or not the player character is performing an action (step S208). When the player character is not performing the action (Step S208; NO), the game operating unit 22 makes the player character start performing the action of the technique corresponding to the type of the inputted operation (step S210). Thereafter, the player pattern information generating unit 226 renews the player pattern information 734j and stores the tendency of the actions inputted by the player (step S212).

Then, the CPU character operating unit 222 performs the operation control of the CPU character (dotted-line circle B). In detail, the CPU character operating unit 222 selects the action according to the thinking pattern information 738 obtained in Step S202 (S214). For example, the CPU character operating unit 222 determines the type of the action and the timing for taking the action according to the operation signal inputted through the operation input unit 10, the action condition of both the player character and the CPU character and the distance between the player character and the CPU character.

When "attack" is selected (Step S216; YES), the CPU character operating unit 222 weights the selection of the attack technique based on the thinking pattern information 738 with the input frequency of the attack element of the player pattern information 734j, to determine the attack technique (step S218). In detail, "normal 1" of the thinking pattern information 738 is selected so that the attack techniques of "punch", "kick" and "special technique A" are selected at the equal probability. The CPU character operating unit 222 weights the selection of the techniques of "punch", "kick" and "special technique A" with the input frequencies of 16%, 77% and 7%" with reference to the player pattern information 734j shown in FIG. 6. As a result, the CPU character operating unit 222 reflects the play style of the player who has used the CPU character, and selects the technique "kick" at high probability.

When "defense" is selected (Step S216; NO, Step S220; YES), the CPU character operating unit 222 weights the selection of the defense technique based on the thinking pattern information 738 with the input frequency of the defense element of the player pattern information 734j, to determine the defense technique (step S222). In detail, "normal 1" of the thinking pattern information 738 is selected so that the attack techniques of "upper guard", "middle guard" and "lower guard" are selected at the ratio of 2:1:1. The CPU character operating unit 222 weights the selection of the techniques of "upper guard", "middle guard" and "lower guard" with the input frequencies of 3%, 94% and 3%" with reference to the player pattern information 734j shown in FIG. 6. As a result, the CPU character operating unit 222 selects the technique "upper guard" and "middle guard" at high probability.

In the same manner, when "movement" is selected (Step S216; NO, Step s220; NO, Step S224; YES), the CPU character operating unit 222 weights the selection of the movement technique based on the thinking pattern information 738 with the input frequency of the movement element of the player pattern information 734j, to determine the movement technique (step S222).

When the fighting technique is selected, the CPU character operating unit 222 performs the action of the fighting technique (step S228).

Thereafter, when the game operating unit 22 performs the determination processing for the versus fighting game according to conditions of the player character and the CPU character in the same manner as in the earlier development, the game operating unit 11 increases or decreases the power gauges of the player character and the CPU character on the basis of the determination result (Step S230). Then, the fighting time is counted (step S232). The game operating unit 222 performs the processing in Steps S206 to S232 repeatedly until the predetermined round end condition is satisfied (step S234).

When the current round is ended (Step S234; YES), for example, when the fighting time in the round exceeds the predetermined time or the power gauge 4 of any one of characters reaches zero, the game operating unit 22 determines whether the player character wins or loses in the current round, and stores the fighting result (Step S236). Further, the game operating unit 22 changes the display 6 of the fighting result according to the fighting result.

Then, when the regular number of rounds are ended (Step S238; YES), the play data changing unit 223 renews the play data of the player character and the CPU character. In detail, the play data changing unit 223 changes the experience value 734g, the total fighting record 734h and the level table 734k for each opponent's character in the play data 734e of the player character according to the fighting result (Step S240). Thereafter, the play data changing unit 223 changes the experience value 734g, the CPU-operated fighting record 734i and the level table 734k for each opponent's character in the play data 734e of the character operated as the CPU character according to the fighting result (Step S242), and returns to the flow shown in FIG. 11.

When finishing the versus fighting play processing, the game operating unit 22 performs the powerful group registration information changing processing in FIG. 11 (Step S142). FIG. 14 is a flow chart for explaining the powerful group registration information changing processing according to the first embodiment. As shown in FIG. 14, the powerful group registration unit 221 changes the fighting records 744d of the powerful group to which the player character belongs and the powerful group to which the CPU character belongs, and changes the control ratio 744c according to the fighting result obtained according to the versus fighting play processing (Step S302). When there is a powerful group having the control ratio of 0% by changing the control ratio 744c (Step S304; YES), the powerful group registration unit 221 deletes the registration of the powerful group having the control ratio of 0%, and determines the assigned powerful group 734d (refer to FIG. 4) of characters assigned to the deleted powerful group to be non-fixed (Step S306).

Because the play data of both the player character and the CPU character are renewed according to the versus fighting play processing, the powerful group registration unit 221 renews the ranking of the characters in the powerful group, and stores the renewed ranking in the assigned character table 744f (Step S308). As a result of the renew of the ranking, when the leader character of the powerful group is changed (Step S310; YES), that is, when the character having the ranking "1" is changed, the play data changing unit 223 changes the play data 734e of the new leader character, gives a predetermined advantage to the new leader character (Step S312), and returns to the flow in FIG. 11. Here, for example, the predetermined advantage may be to permit to use a specific item, a specific magic or the like, to change the predetermined parameter such as to give a experience value bonus or increase money, or the like, and may be determined as the occasion may demand.

In FIG. 11, the powerful group display control unit 225 displays the powerful group map M on the display unit 30, and informs the player of the state of the powerful group changed as a result of the fighting (Step S144). FIGS. 20A and 20B are views showing examples of the screens of the powerful group map M in Step S144. FIG. 20A shows the state wherein the number of powerful group flags M2 of the powerful group which is a winner is increased as compared with that shown in FIG. 19. The player recognizes that the power of the powerful group is increased. Also, FIG. 20B shows the case wherein one powerful group is destroyed. In this case, the text indicating the destruction may be displayed on the screen.

Thereafter, when the highlight scene selecting unit 227 determines that the above-described fighting includes the highlight scene with reference to the highlight scene selecting condition 748 (Step S146), the highlight scene selecting unit 227 stores the highlight scene in the highlight scene information 750 (step S148), and finishes the game.

[Explanation of Versus Fighting Mode Processing]

Next, the procedure in case the versus fighting mode is selected on the play mode selecting screen, will be explained. In FIG. 11, when the versus fighting mode is selected on the play mode selecting screen (Step S104; NO), the game operating unit 22 performs the versus fighting processing (Step S149).

FIG. 15 is a flow chart for explaining the versus fighting mode processing according to the first embodiment.

First, the game operating unit 22 displays the character selecting screen, to make the player to select the player character (step S402). The player character selecting screen includes a selection column of the characters registered by the player. When the player selects the selecting column, the game operating unit 22 displays the soft keyboard on the display unit 30 to make the player input the password.

When the password is inputted on the character selecting screen (Step S404; YES), the game operating unit 22 determines the character to the password to be the player character (Step S406). On the other hand, when the password is not inputted (Step S404; NO), the game operating unit 22 selects the character from the characters determined in the character determination information 730 in response to the selecting operation (Step S408).

Thereafter, the game operating unit 22 makes the player to select the CPU character like the player character (Step S410). The CPU character selecting screen includes the selection column of the characters registered by the player. When the player selects the selecting column, the game operating unit 22 displays the soft keyboard on the display unit 30 to make the player input the password.

When the password is inputted on the CPU character selecting screen (Step S412; YES), the game operating unit 22 determines the character corresponding to the password to be the CPU character (Step S414). On the other hand, when the password is not inputted (Step S412; NO), the game operating unit 22 selects the character from the characters determined in the character determination information 730 in response to the selecting operation (Step S416).

When the player character and the CPU character are determined, the game operating unit 22 performs the versus fighting play processing (Step S418).

According to the above-described processing, the player can determine the character different from the character registered by the player to be the player character, make the player character fight against the character registered by the player. Consequently, the player can strengthen the character registered by the player, or confirm the level of the character registered by the player. Further, the player can enjoy playing the versus fighting play by operating the player character and the CPU character as the character registered by the player.

[Structure of Hardware]

Next, the hardware structure capable of realizing the arcade game apparatus 1300 will be explained.

Figure 21:
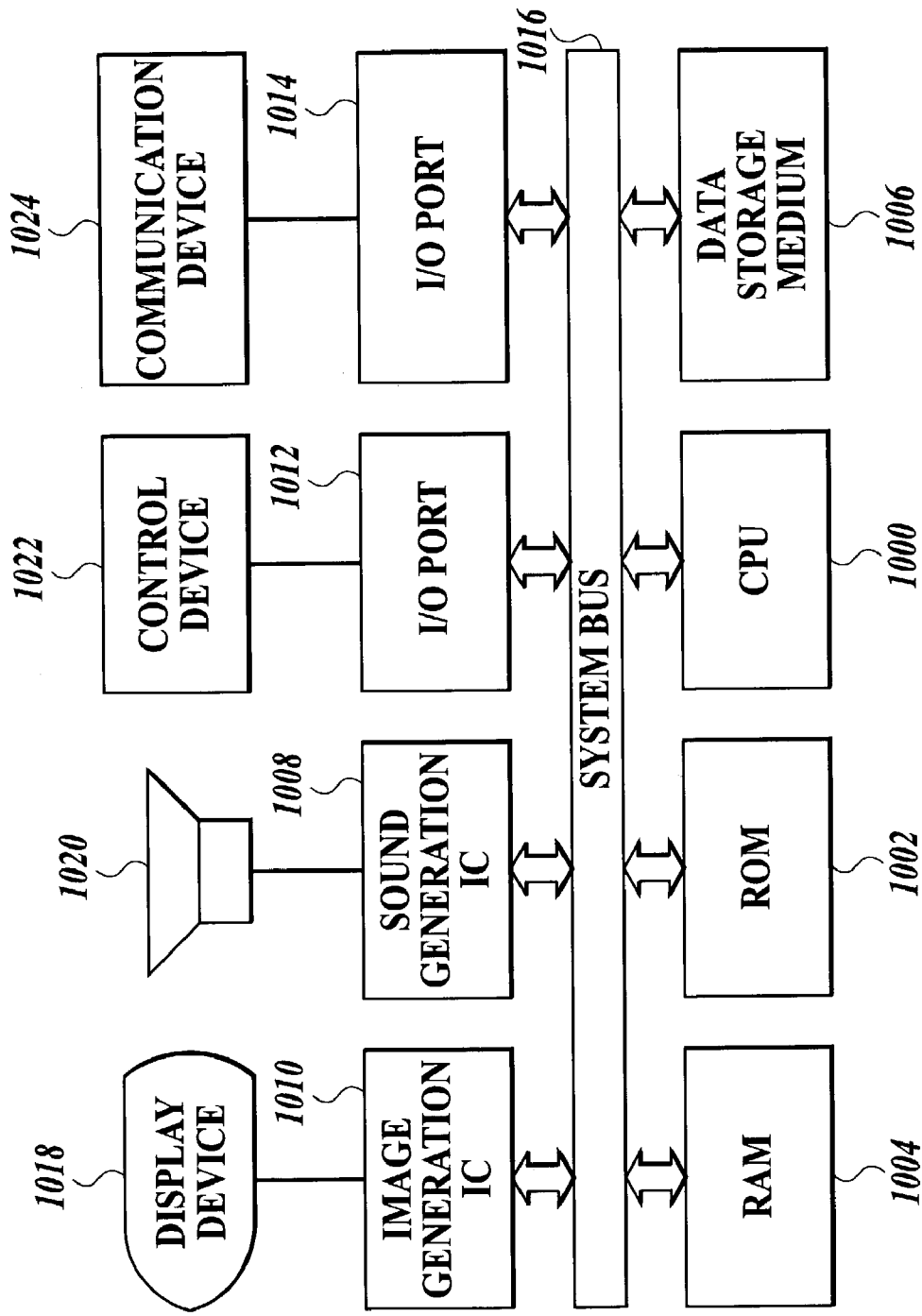
FIG. 21 is a block diagram showing an example of a hardware structure realizable of the first embodiment.

FIG. 21 is a diagram showing an example of the hardware structure according to the present embodiment. The arcade game apparatus 1300 comprises a CPU 1000, a ROM 1002, a RAM 1004, a data storage medium 1006, a sound generation IC 1008, an image generation IC 1010, and I/O ports 1012 and 1014, that are interconnected by a system bus 1016 so that data can be exchanged therebetween.

The CPU 1000 is equivalent to the processing unit 20 shown in FIG. 3A. The CPU 1000 controls the whole apparatus and performs various data processing, according to programs stored in the data storage medium 1006, the system program stored in the ROM 1002, the operation signal inputted through the control device 1022, or the like.

The ROM 1002, the RAM 1004 and the data storage medium 1006 is equivalent to the storage unit 70 shown in FIG. 3A or 3B.

The ROM 1002 is equivalent to the ROM 1322 shown in FIG. 1, and stores the game information 72 shown in FIG. 3B, and in particular, predetermined programs or data. The RAM 1004 is storage means used as a work area or the like, for the CPU 1000. The RAM 1004 stores given data stored in the data storage medium 1006 or the ROM 1002, or results of the operation performed by the CPU 1000, therein. Further, the RAM 1004 stores the fighting result for every round, therein. The data storage medium 1006 is realized by an IS memory card, a hard disc unit capable of being attached to or detached from the apparatus, a MO or the like, so as to mainly store data changed according to the game play such as the character registration information 734, the powerful group registration information 744, the highlight scene information 750 or the like. The data storage medium 1006 is equivalent to the IC memory cars 1324 shown in FIG. 1.

The sound generation IC 1008 is an integrated circuit for generating game sounds such as sound effects, background music or the like, on the basis of data stored in the data storage medium 1006 or the ROM 1002. The game sounds generated by the sound generation IC 1008 are outputted from the speaker 1020. The speaker 1020 is equivalent to the sound output unit 40 shown in FIG. 3A or the speaker 1304 shown in FIG. 1.

The image generation IC 1010 is an integrated circuit for generating pixel data required to output the images to the display device 1018, on the basis of image data outputted from the RAM 1004, the ROM 1002, the data storage medium 1006 or the like. The display device 1018 is equivalent to the display unit 30 shown in FIG. 3 or the display 1302 shown in FIG. 1.

The control device 1022 is connected to the I/O port 1012, and the communication device 1024 is connected to the I/O port 1014.

The control device 1022 is equivalent to the operation input unit 10 shown in FIG. 3A. The control device 1022 corresponds to the operation panel, the stick 1306 or the push buttons 1308 shown in FIG. 1, or the like. Therefore, the control device 1022 is used so that a player inputs various operations according to the progress of the game to the apparatus body.

The communication device 1024 is a device for communicating various data used by the game apparatus with an external device. When the game apparatus is connected with another game apparatus, the communication device 1024 is used for communicating predetermined data corresponding to the game program, the game program or other data with another game apparatus, through the communications line.

The processing performed by the image generation IC 1010, the sound generation IC 1008 or the like is performed by the CPU 1000, a general-purpose DSP or the like, as a software.

Second Embodiment

Next, a second embodiment to which the present invention is applied will be explained with reference to FIGS. 22A to 26. According to the second embodiment, the present invention is applied to a game system called a network game. The same reference numerals are attached to the same elements as those according to the first embodiment. It is omitted to explain the elements.

[Explanation of Structure]

The system structure realizable of the network game includes, for example, a fist structure wherein a game terminal such as a personal computer prepared at home, a consumer game machine or the like is connected to a server through a wired or wireless communication line such as the Internet, a private line or the like, a second structure wherein a plurality of game terminals are directly connected to each other through a communication line without using a server, a third structure wherein a plurality of game terminals are connected to each other through a communication line, and one of the game terminals functions as a server, and a fourth structure wherein a plurality of game terminals are physically connected to each other so as to be integrally formed into one system (for example, an arcade game system). The present invention can be applied to any of the game structures. In the second embodiment, the first structure wherein the game terminal and the server is connected through a given communication line will be explained.

Herein, the communication line means a communication path through which data can be transmitted. Therefore, the communication line means not only a LAN such as a private line (or a private cable) directly connecting terminals with each other, an Ethernet® or the like but also a communication network such as a telephone communication network, a cable network, the Internet or the like. Further, the communication method includes a wired communication and a wireless communication.

Figure 22A:
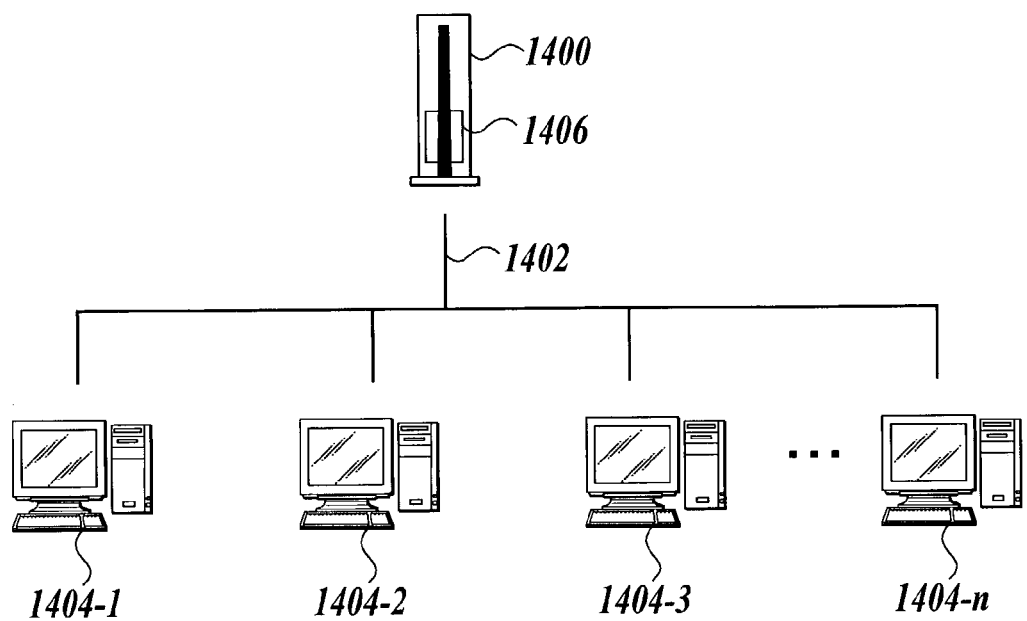
FIGS. 22A and 22B are views showing examples of a network game system to which the present invention is applied.

FIG. 22A is a view showing an example of the structure of the game system according to the second embodiment of the present invention. As shown in FIG. 22A, the game system comprises a server apparatus 1400 and a plurality of game terminals 1404-1 to 1404-n (n denotes an integer) connected to the server apparatus 1400 through a communication line 1402.

The server apparatus 1400 and the game terminals 1404-1 to 1404-n may be provided at one shop, or provided at different places from each other. For example, in the latter, the server apparatus 1400 is provide at a game maker, and the game terminals 1404-1 to 1404-n are provide at shops respectively. In this case, the versus fighting game is performed among the shops through the communication line 1402. finishes advantage finished

[Explanation of Functional Blocks]

Figure 23A:
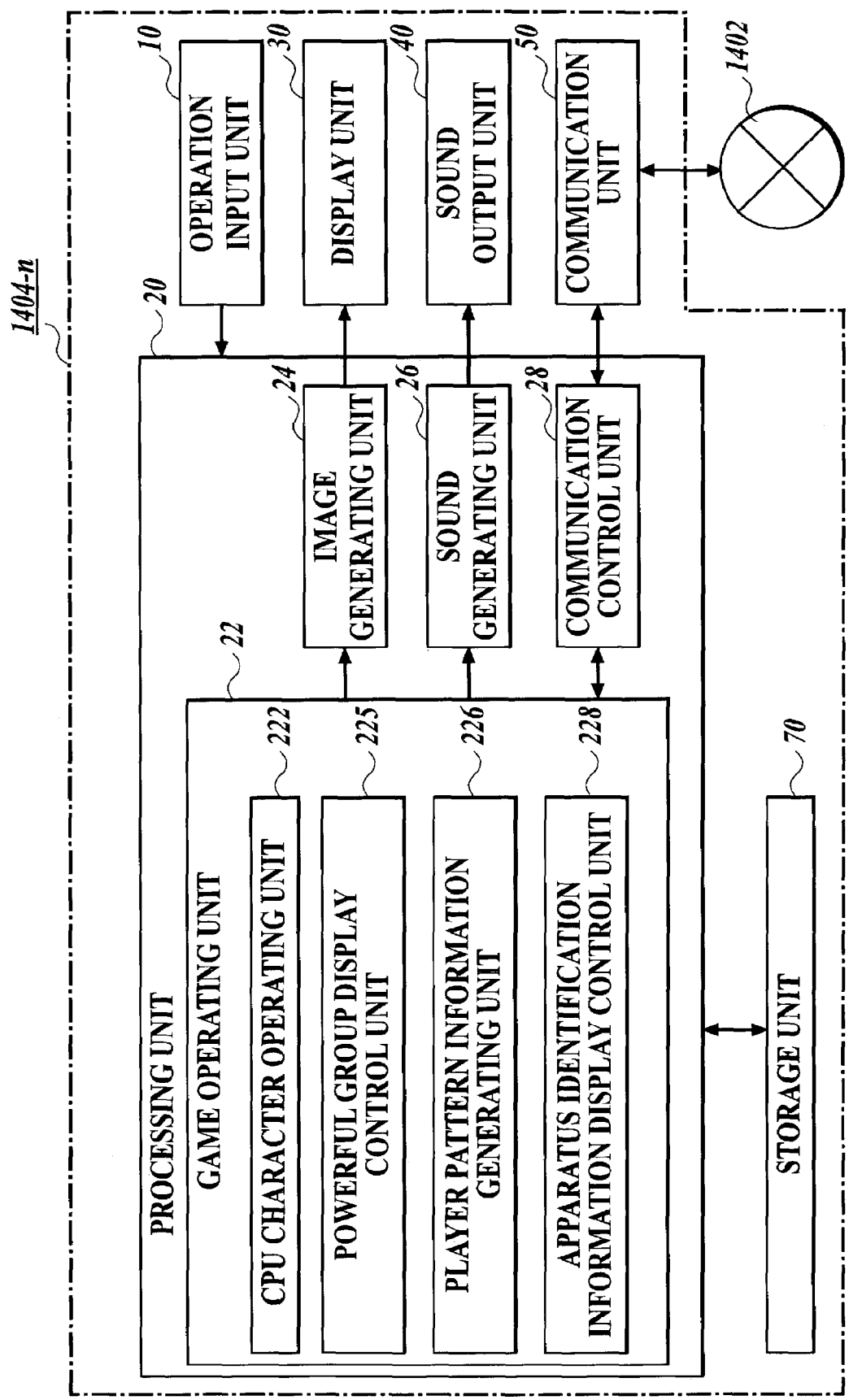
FIGS. 23A and 23B are functional block diagrams for explaining an example of a functional structure of a game terminal 1404-n according to the second embodiment.
Figure 23B:
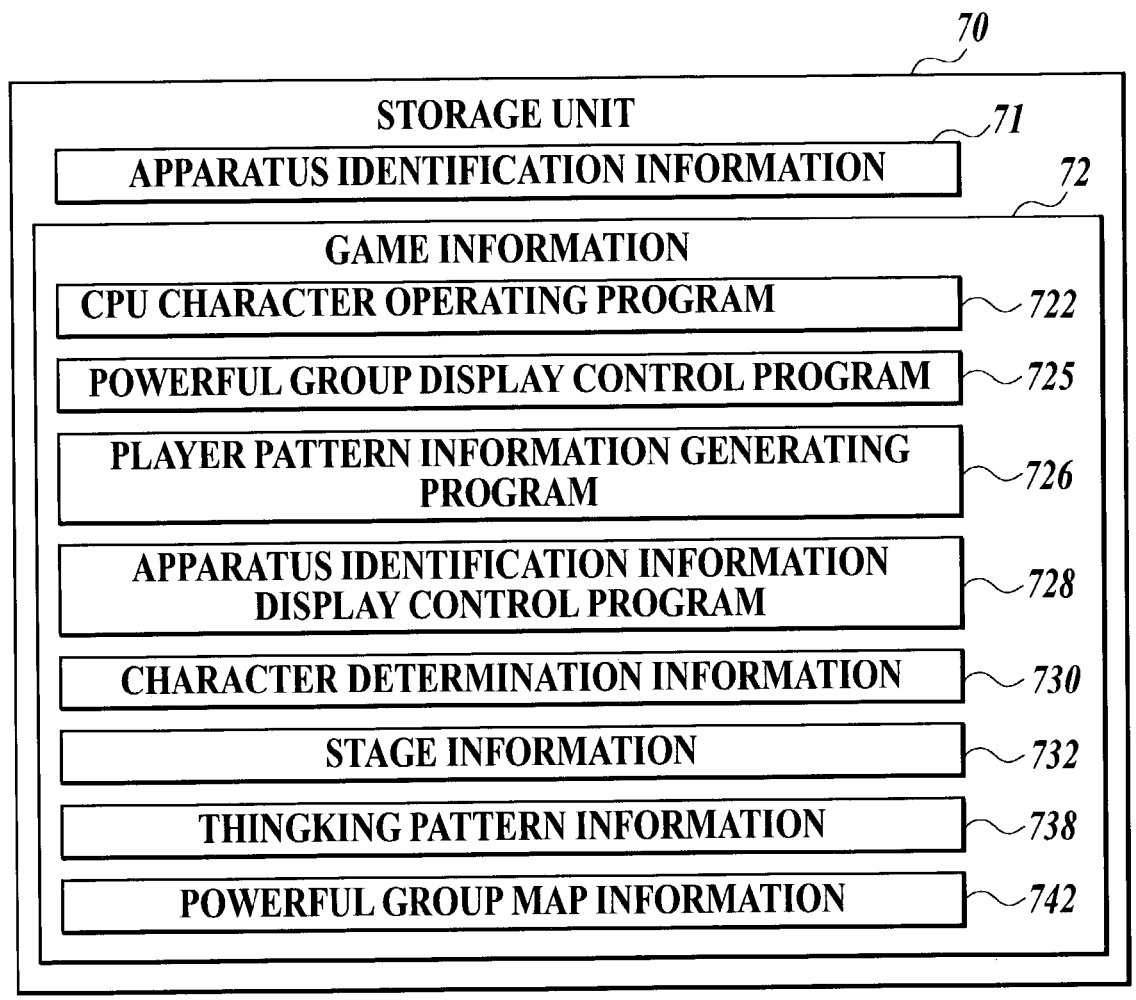
Figure 24A:
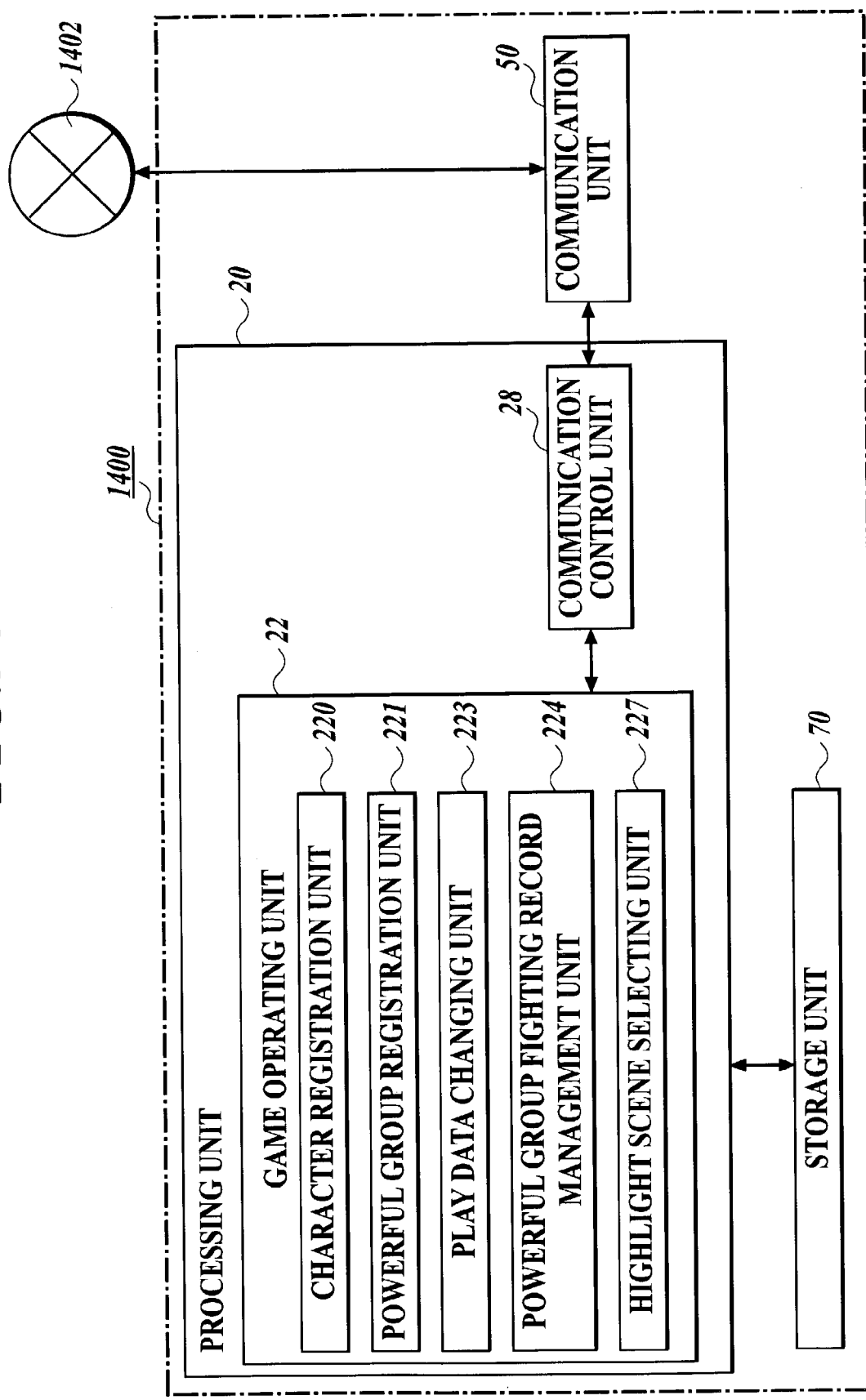
FIGS. 24A and 24B are functional block diagrams for explaining an example of a functional structure of a server apparatus 1400 according to the second embodiment.
Figure 24B:
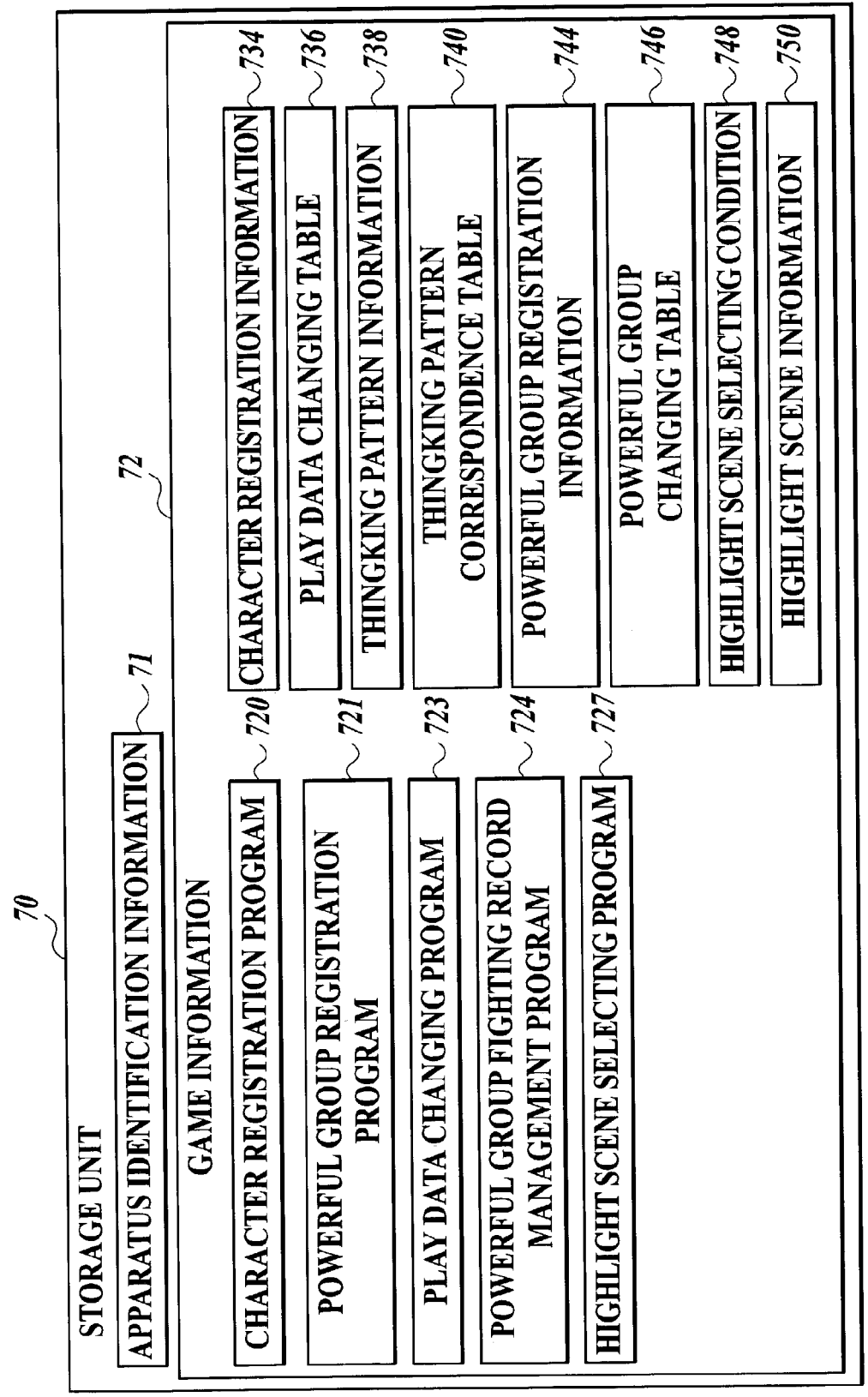

FIG. 23A and FIG. 23B are functional block diagrams for explaining an example of the functional structure of the game terminal 1404, and FIG. 24A and FIG. 24B are functional block diagrams for explaining an example of the functional structure of the server apparatus 1400, according to the second embodiment.

As shown in FIG. 24A and FIG. 24B, the server apparatus 1400 mainly stores and manages the character registration information 734, the powerful group registration information 744 and the highlight scene information 750, and comprises functional blocks for the information. As shown in FIG. 23A and FIG. 23B, the game terminal 1404 comprises functional blocks for displaying the game screen on which the player inputs the operation for the versus fighting action game. FIGS. 23A and 23B show the case the thinking pattern information 738 is stored in the game terminal 1404-n. However, the thinking pattern information 738 may be stored in the server apparatus 1400 and distributed from the server apparatus 1400 to the game terminal 1404-n.

According to the second embodiment, the server apparatus 1400 and the game terminal 1404-n have communication control units 28 and communication units 50. The communication control unit 28 manages the communication between the server apparatus 1400 and the game terminal 1404-n according to a predetermined communication protocol. The communication unit 50 is realized by, for example, a modem, a terminal adapter, a wireless communicating apparatus or the like. The communication unit 50 is connected to the communication line 1402 to exchange data between the server apparatus 1400 and the game terminal 1404-n.

[Explanation of Processing]

Figure 25A:
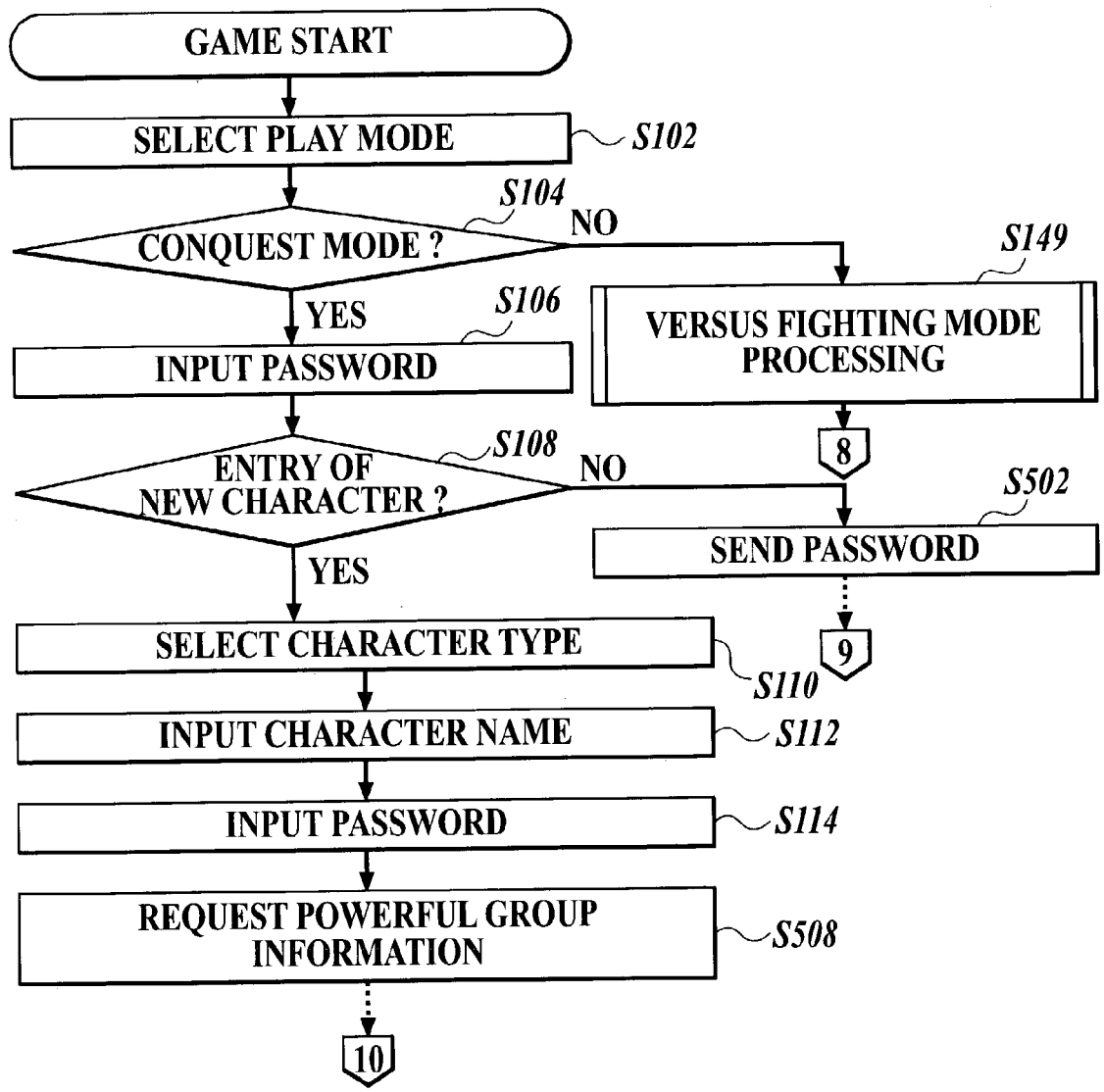
FIGS. 25A, 25B and 25C are flow charts for explaining a flow of a processing according to the second embodiment.
Figure 25B:
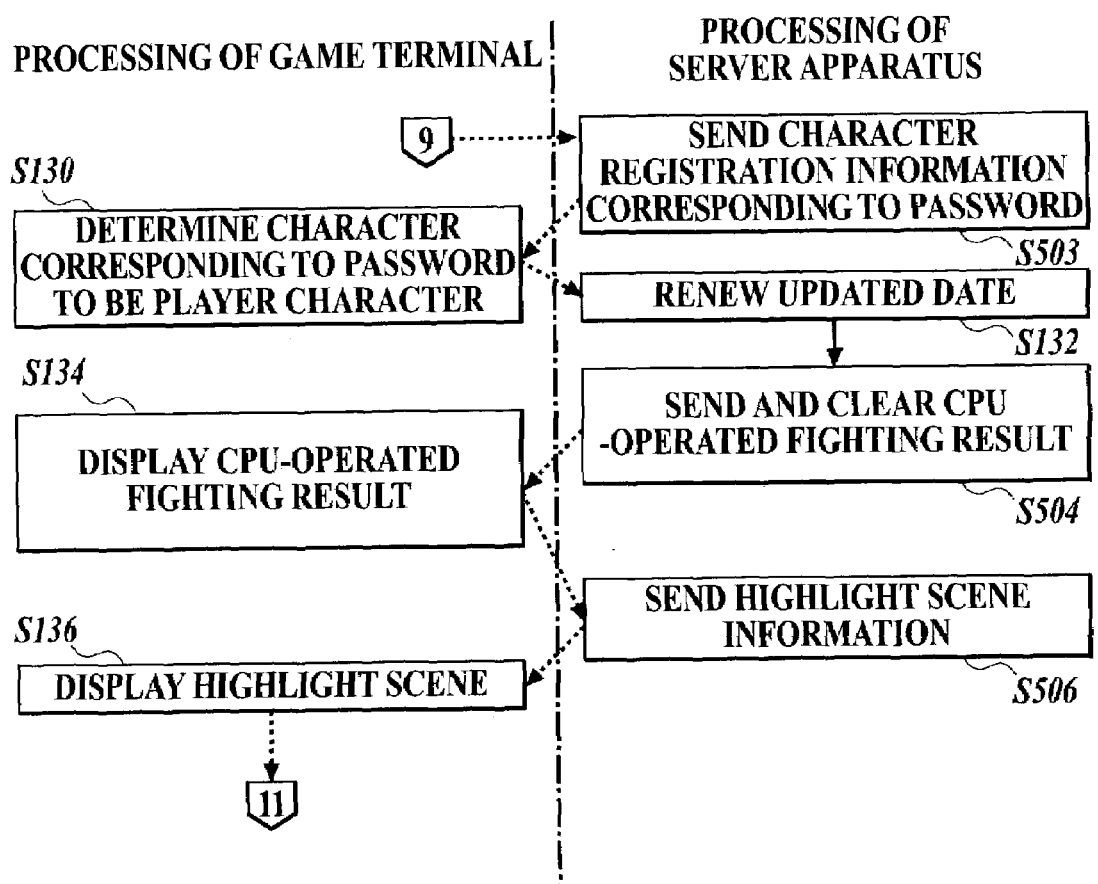
Figure 25C:
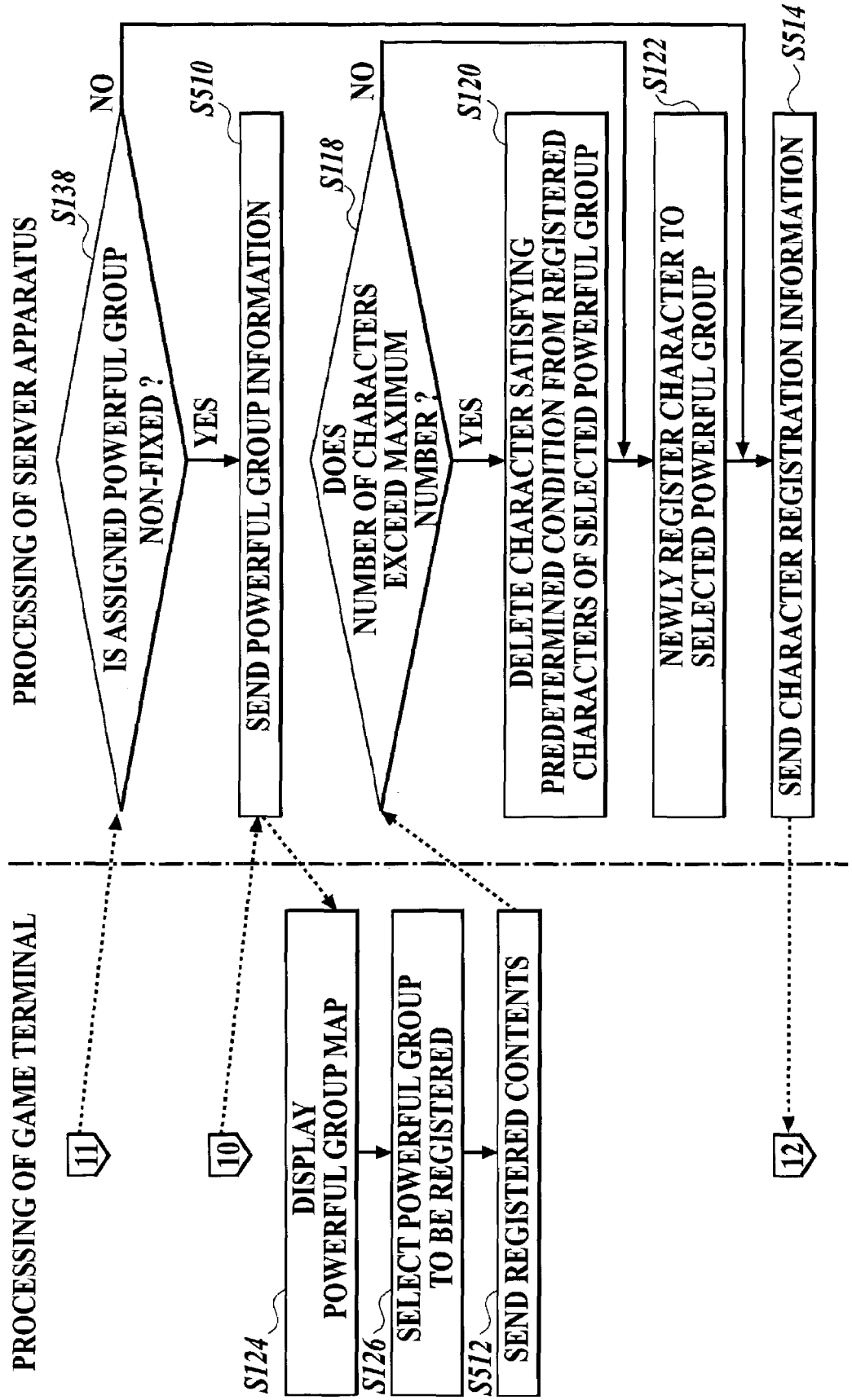
Figure 26:
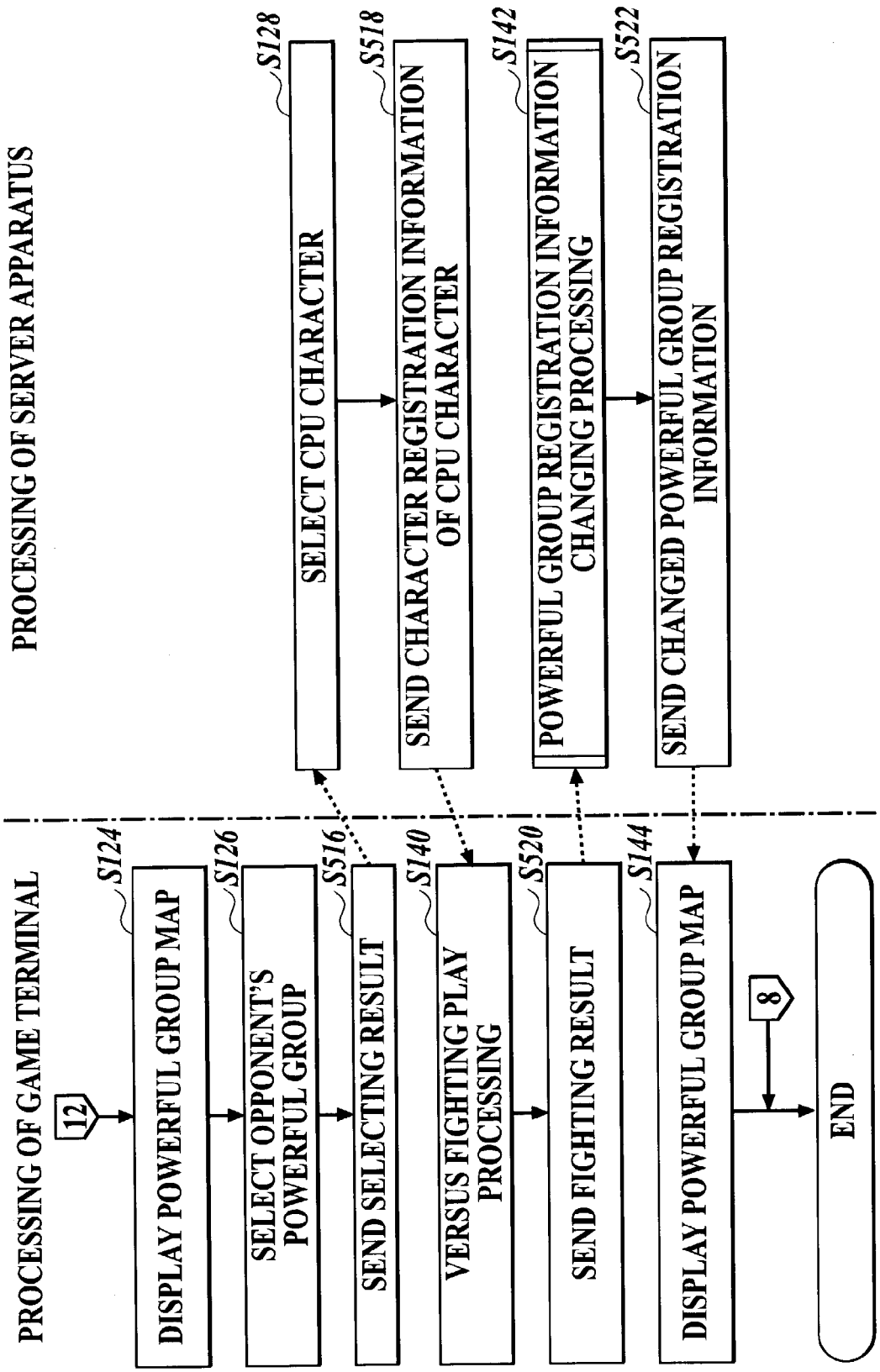
FIG. 26 is a flow chart for explaining the flow of the processing according to the second embodiment.

FIG. 25A to FIG. 26 are flow charts for explaining the processing according to the second embodiment. As shown in FIGS. 25A to 26, the server apparatus performs the processing for storing and managing the character registration information 734, the powerful group registration information 744 and the highlight scene information 750. Each game terminal 1404-n performs the processing for displaying the game screen to make the player input the operation for the versus fighting action game. Steps for requesting or exchanging data required to communicate through the communication line 1402 are added to the processing as the occasion may demand, and expressed by Steps 500s, and the communication for Steps 500s is shown by dotted lines, in FIG. 25A to FIG. 26.

Figure 22B:
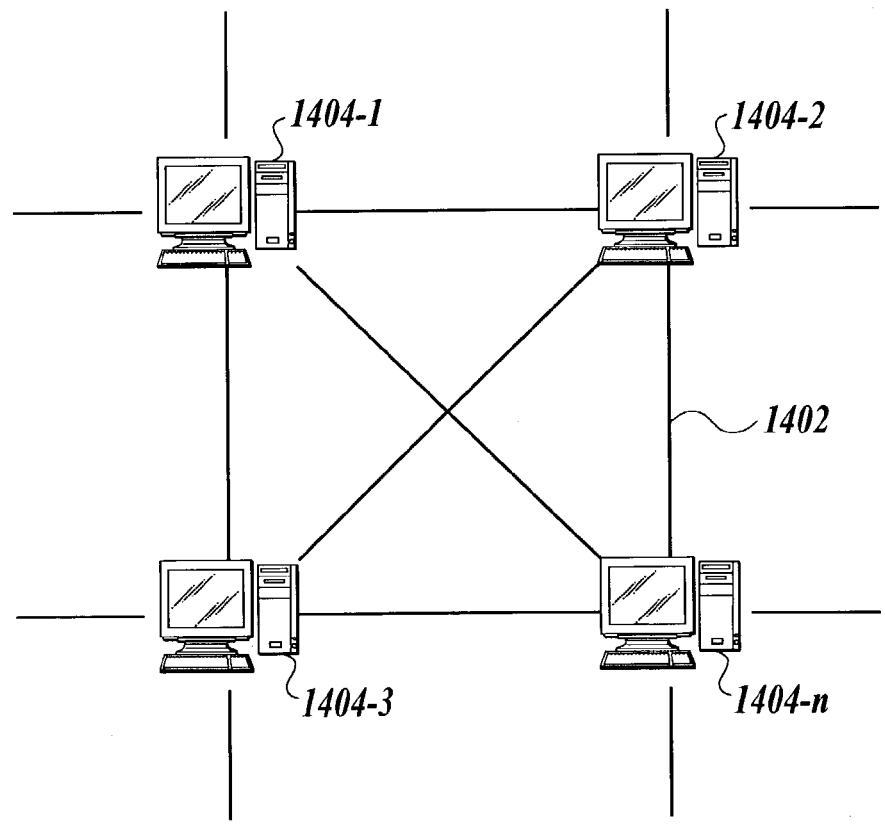

The structure of the game system according to the second embodiment is not limited to that shown in FIG. 22A. For example, the structure may be the above-described second structure wherein a plurality of game terminals are connected to each other through the communication line without using the server, as shown in FIG. 22B. In the structure of the game system shown in FIG. 22B, there is any apparatuses corresponding to the server apparatus 1400. The game terminals 1404-1 to 1404-n are connected to each other through the communication line, and the functions of the present invention are distributed to and performed by the game terminals 1404-1 to 1404-n. In the same way, the programs or data required to realize the functions of the present invention may be distributed to and stored in the storage units of the game terminals 1404-1 to 1404-n.

The game terminal 1404-n includes not only the arcade game apparatus 1300 of the first embodiment but also a personal computer, a consumer game machine, a portable terminal such as a personal digital assistant (PDA) or the like. When the arcade game apparatus is connected to the network, the arcade game apparatus may have a structure so as to use a portable information storage device such as a memory card or a portable game machine capable of exchanging data with the arcade game apparatus 1300 or the consumer game machine.

Third Embodiment

Next, a third embodiment to which the present invention is applied will be explained with reference to FIG. 27 to FIG. 30B. According to the third embodiment, it will be explained that the present invention is applied to a game system capable of performing a group fighting game that a plurality of players can participate in the versus fighting game simultaneously. The same reference numerals are attached to the same elements as those according to the first embodiment. It is omitted to explain the elements.

[Explanation of Structure]

Figure 27:
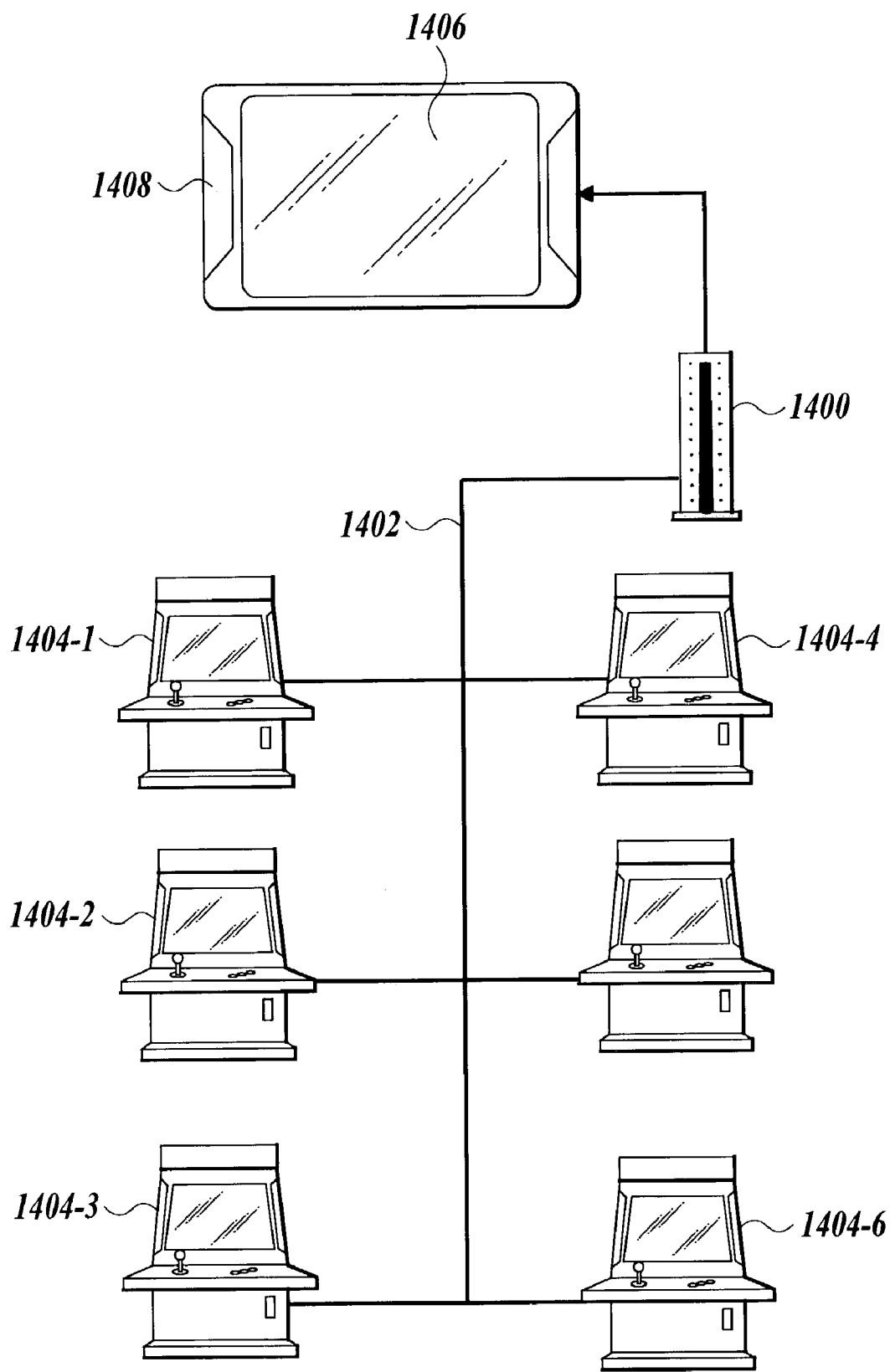
FIG. 27 is a view showing an example of the structure of the network game system according to the third embodiment.

FIG. 27 is a view of an example of the structure of the game system according to the third embodiment. As shown in FIG. 27, the game system comprises the server apparatus 1400 and the game terminals 1404-1 to 1404-n (n is an integer) connected to the server apparatus 1400 through the communication line 1402. Further, according to the third embodiment, a large-scaled screen 1406 and a speaker 1408 are connected to the server apparatus 1400. The large-scaled screen 1406 includes not only a single large-scaled display but also a multi-screen display having a plurality of displays arranged in parallel to each other, a combination of a projector and a projection screen, and so on. The server apparatus 1400, the game terminals 1404-n and so on consist of one system, and are provided and used at, for example, a large-scale game center, an amusement place or the like.

Figure 28:
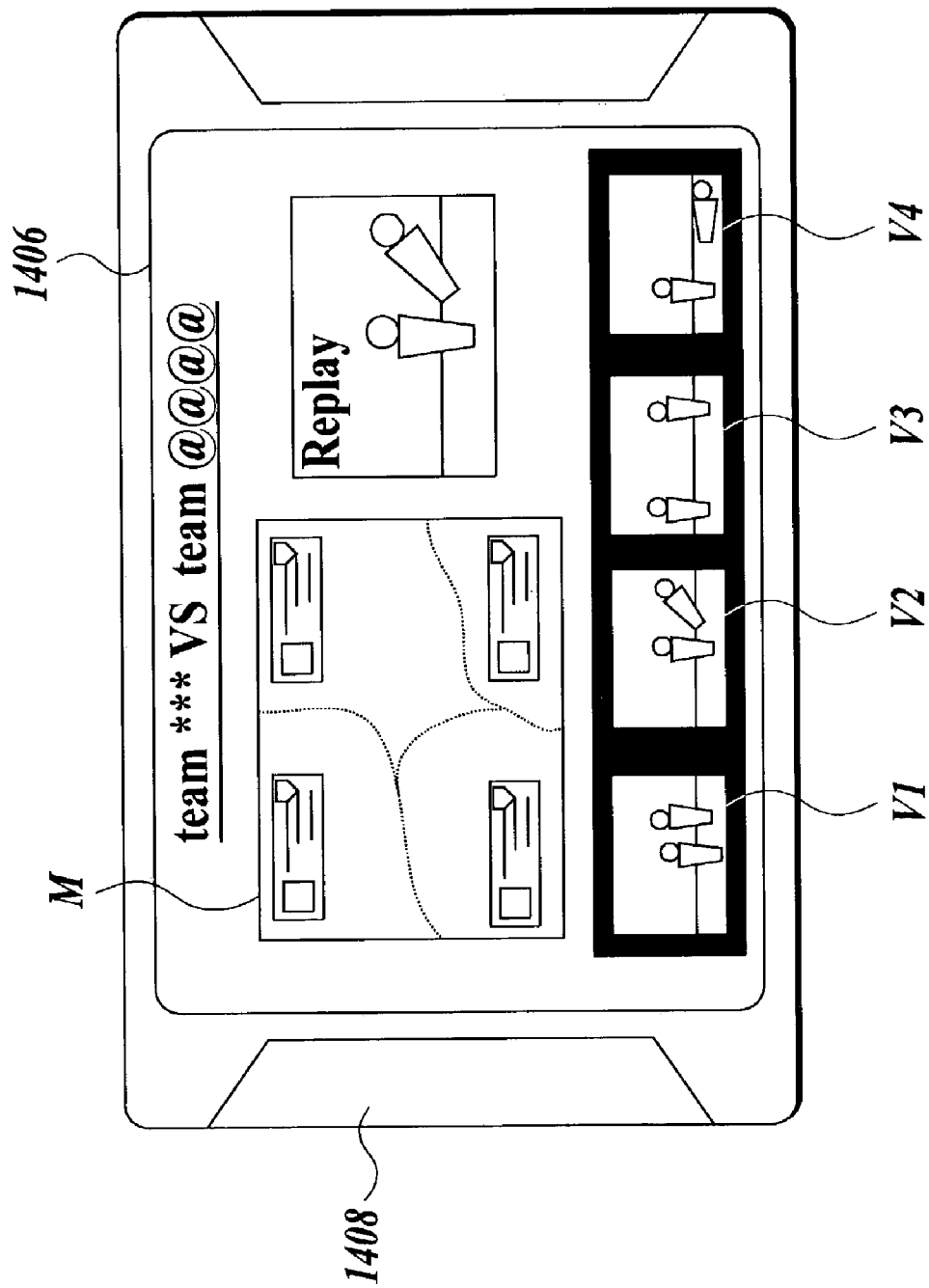
FIG. 28 is a view showing an example of a screen structure displayed on a large-scaled screen.

FIG. 28 is a view showing an example of a screen structure displayed on the large-scaled screen 1406. As shown in FIG. 28, the powerful group map M and a plurality of live screens V1, V2, V3 and V4 during each fighting play are displayed on the large-scaled screen 1406. The server apparatus 1400 receives game images sent from the game terminal 1404-n, and displayed the live screen V on the large-scaled screen 1406. Because the technique for displaying the live screen V is practically used and well-known, it is omitted to explain it.

[Explanation of Functional Blocks]

Figure 29A:
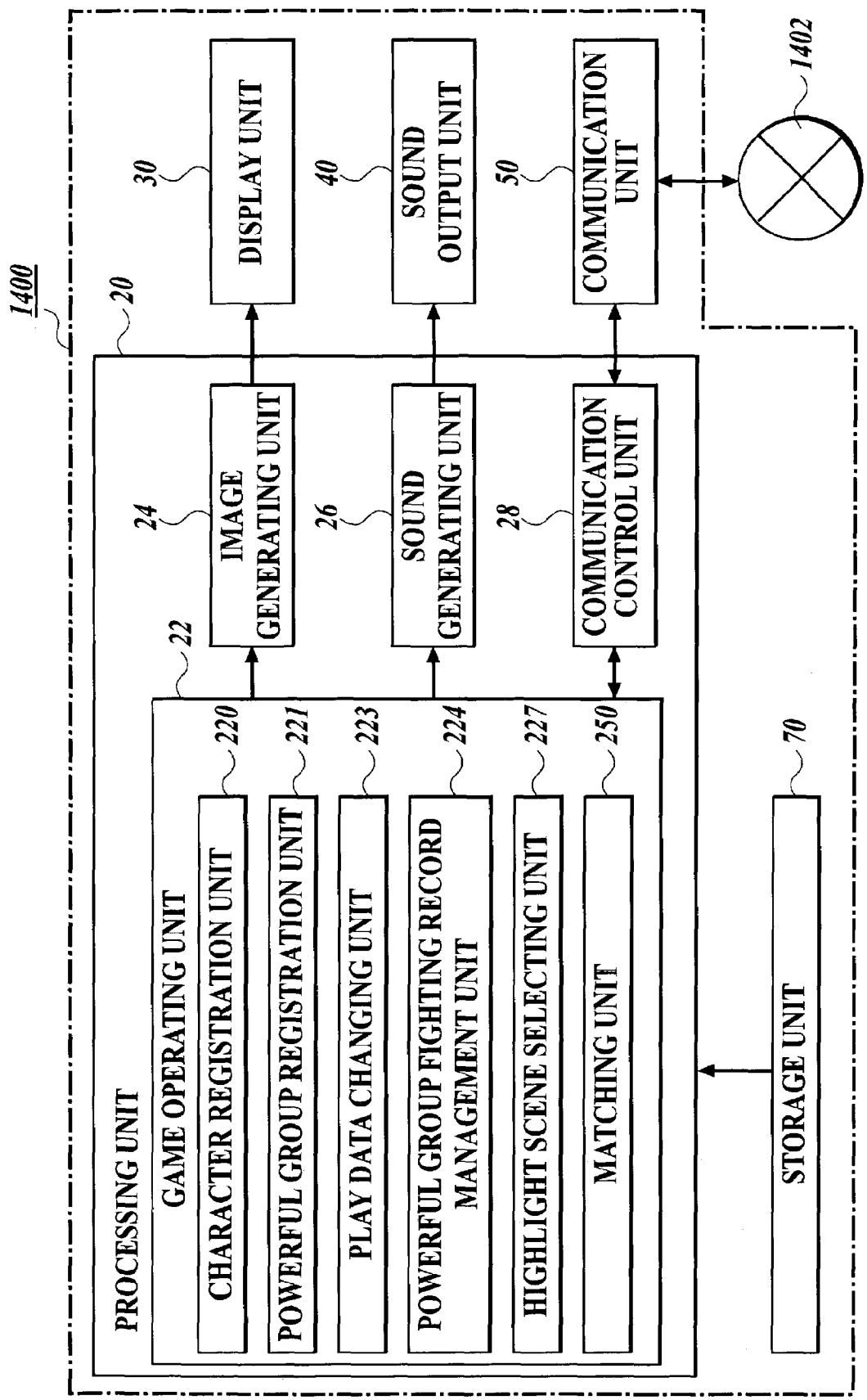
FIGS. 29A and 29B are functional block diagrams for explaining an example of the functional structure of the server apparatus 1400 according to the third embodiment.
Figure 29B:
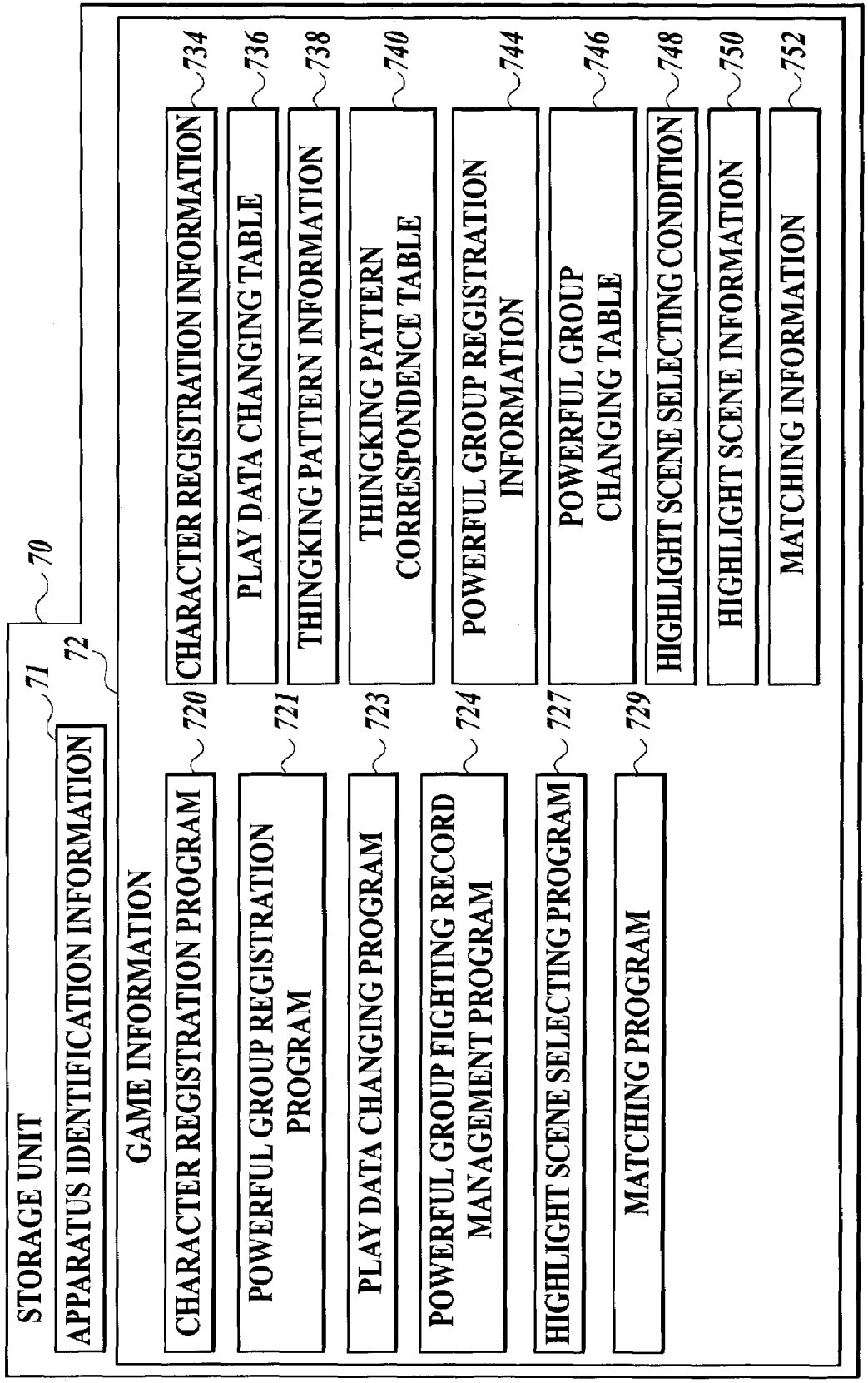

FIG. 29A and FIG. 29B are functional block diagrams for explaining an example of the functional structure of the server apparatus 1400 according to the third embodiment. As shown in FIG. 29A and FIG. 29B, the server apparatus 1400 has substantially the same functional blocks as those according to the second embodiment, excluding the following units.

That is, the server apparatus 1400 comprises the display unit 30 and the image generating unit 24 corresponding to the large-scaled screen 1406 of FIG. 27, and the sound output unit 40 and the sound generating unit 26 corresponding to the speaker 1408 of FIG. 27. Further, the server apparatus 1400 comprises a matching unit 250 in the processing unit 22.

The matching unit 250 performs a matching processing between the game terminals 1404-n as a fighting pair. A matching program 729 included in the game information 72 is a program for making the processing unit 20 function as the matching unit 230. The information for the matching processing is stored in the storage unit 70 as matching information 752 by the matching unit 250. That is, the server apparatus 1400 has a function as a so-called matching sever. Because the matching technique can be realized by a well-known technique, it is omitted to explain the matching technique.

[Explanation of the Processing]

Figure 30A:
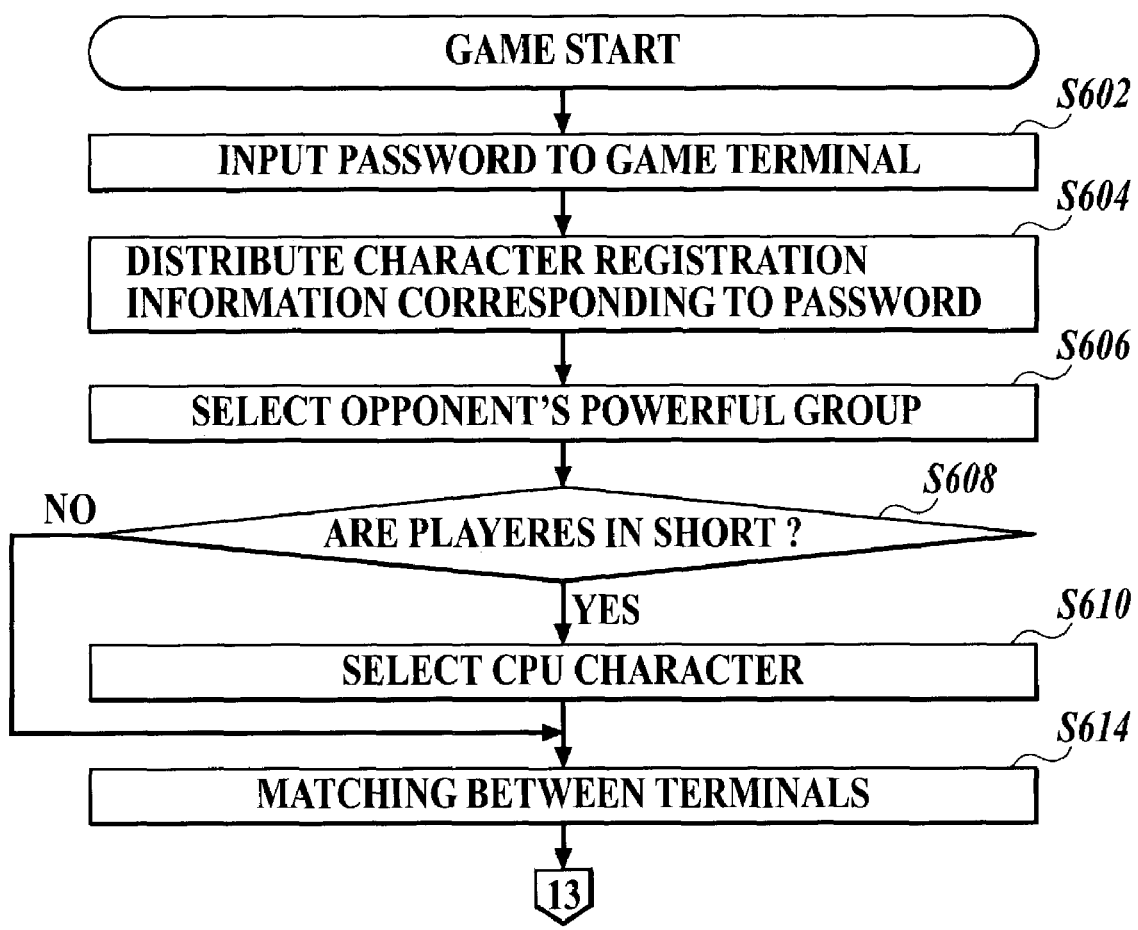

FIG. 30A and FIG. 30B are flow charts for explaining the processing according to the third embodiment. As shown in FIG. 30A and FIG. 30B, when the player inputs the password to the game terminal 1404-n (Step S602), the server apparatus 1400 sends the character registration information corresponding to the password to the game terminal 1404-n (Step S604).

Then, the player selects the opponent's powerful group in the game terminal 1404-n (Step S606). When the players in the powerful groups fighting against each other are in short (Step S608; YES), the server apparatus 1400 selects the CPU character (Step S610).

Thereafter, the matching unit 230 performs the matching processing between the game terminals, to determine the fighting pair (Step S614). The matched game terminals 1404-n perform the versus fighting play through the communication line 1402 (Step S616).

The relay screen of the versus fighting play is relayed from the game terminal 1404-n to the server apparatus 1400 (Step S618). When receiving the relay screen of the versus fighting play from the game terminal 1404-n, the server apparatus 1400 displays the relay screen on the large-scaled screen 1406 (Step S620).

When there is a fighting pair which finishes the versus fighting play (Step S622; YES), the server apparatus 1400 receives the fighting result from the game terminals 1404-n of the fighting pair (Step S624), and distributes the fighting results to the game terminal 1404-n of other fighting pairs (Step S626). When receiving the fighting result, the game terminals 1404-n displays prompt reports of the received fighting result on the screens thereof (Step S628).

Then, the server apparatus 1400 performs the powerful group registration information changing processing according to the received fighting result (Step S630), and renews the powerful group map according to the changed powerful group registration information (Step S632). The server apparatus 1400 performs the processing in Steps S616 to S632 repeatedly until all the fighting pairs finish the versus fighting play (Step S634).

When all the fighting pairs finished the versus fighting play (Step S634; YES), the server apparatus 1400 totals the fighting results of all the fighting pairs, determines the processing between the powerful groups, and gives the predetermined advantage to the play data of characters assigned to the winning powerful group (Step S638).

Although the present invention has been explained according to the above-described first, second and third embodiments, it should also be understood that the present invention is not limited to the first embodiment and various changes and modifications may be made to the invention without departing from the gist thereof.

For example, the player may advantageously play the game according to the number of coins inserted in the coin insert unit 1310 of the arcade game apparatus 1300. More specifically, for example, the condition changing according to the number of inserted coins may be provided at the play data changing table 736, so as to increase the experience value obtained at one versus fighting play as the number of inserted coins is increased. Consequently, when the player inserts many coins, the player can raise the level table 734$k$ for each opponent's character more rapidly, and obtain the stronger thinking pattern information 738. Further, the thinking pattern correspondence table 740 including the stronger thinking pattern information 738 in proportion to the number of inserted coins may be prepared and changed according to the number of inserted coins. In this case, it is required to display a selecting screen for selecting the number of inserted coins for every play before the player start the game.

Further, the condition changing according to the number of inserted coins may be provided at the powerful group changing table 746, so as to raise the changing rate of the obtained control rata according to the number of inserted coins.

Various conditions may be determined according to not only the inserted coins but also medals or electric money as the consideration of the game, or currency of items of the game.

Further, for example, the arcade game apparatus 1300 may comprise a reading unit 1332 for a data storage medium 1330 such as an IC memory card, a MD, a MO or the like attachable to and detachable from the data reading unit 1332, so as to store the character registration information 734 in the data storage medium 1330. The game terminal 1404-n may comprise the reading unit 1332 for the data storage medium 1330 like the arcade game apparatus 1300. In this case, a data matching unit may be prepared so as to match the character registration information 734 stored in the data storage medium 1330 with the character registration information 734 stored in the server apparatus 1440.

Further, although the versus fighting game has been explained according to the above-described embodiments, the game to which the present invention is applied is not limited to the fighting game. For example, the present invention may be applied to a shooting game for doing a shootout in a game field, a mahjongg game, a baseball game or a soccer game with teams composed of a plurality of characters, or the like.

Further, the mode in the game play is not limited to the conquest mode and the versus fighting mode but determined as the occasion may demand. Each mode may be prepared so as to read out and use the characters registered in the conquest mode according to the password.

As described above, because the character used by the player when playing the game and the play data of the character are related to the account and registered, the player can read out the character by inputting the account, and use the character as the player character or the CPU character. Further, when the character is used as the CPU character, the character can be controlled by the play data corresponding to the character. Consequently, the player can enjoy playing the fight against the character which has been controlled and trained by the player in the predetermined game wherein a plurality of players enjoy operating own registered characters by inputting own accounts.

The entire disclosure of Japanese Patent Application No. Tokugan 2002-182210 filed on Jun. 21, 2002 including specification, claims, drawings and summary are incorporated herein by reference in its entirety.

What is claimed is:

1. A game performing method comprising:
   storing a player character of each of a plurality of players as a registered character, bringing into correspondence operation input tendency information indicating tendency in operation inputted by a player, a player character owned by the player, and an experience value and/or a level of the player character;
   selecting the registered character as a CPU character for a fight according to an operation inputted by the one player of the plurality of players;
   performing a fighting game of the CPU character and a player character of the one player, by automatically controlling the CPU character according to the operation input tendency information of the player owning the registered character which is made the CPU character;
   updating the operation input tendency information of the one player according to an operation inputted by the one player during the fight;
   storing a result of the fight;
   changing the experience value and/or the level of the CPU character according to the result of the fight;
   changing the experience value and/or the level of the player character owned by the one player according to the result of the fight; and
   informing, when the one player starts a new fighting game, of the result of the fighting game performed with the player character owned by the one player as the CPU character without the one player's knowledge.

2. The method as claimed in claim 1,
   wherein selecting the registered character which is to be made the CPU character is to select from the registered characters including the player character owned by the one player.

3. The method as claimed in claim 1, further comprising:
   storing a plurality of thinking pattern information in accordance with the experience value and/or the level,
   wherein the performing a fight includes determining a timing to make the CPU character employ a technique on the basis of the thinking pattern information related to the experience value and/or the level of the registered character which is made the CPU character, and determining a type of technique when it is determined to make the CPU character employ the technique on the basis of the operation input tendency information.

4. The method as claimed in claim 1, wherein the operation input tendency information includes a frequency for every technique type of being performed by the player character.

5. The method as claimed in claim 2, wherein the operation input tendency information includes a frequency for every technique type being performed by the player character.

6. The method as claimed in claim 1, further comprising:
setting a plurality of groups with which the player character can be affiliated;
affiliating a player character with any one of the plurality of groups on the basis of an operation inputted by a player who owns the player character, when the new player character is newly affiliated as the registered character;
managing a fighting result of each of the plurality of groups on the basis of a result of the fight of each of the registered characters;
determining a group with a fighting result which satisfies a predetermined condition for deleting a group, form the managed fighting result of the each of the plurality of groups;
deleting the group which satisfies the predetermined condition; and
determining affiliation of the character affiliated with the deleted group to be non-fixed.

7. The method as claimed in claim 6, further comprising:
receiving a consideration of the fighting game,
wherein the managing a fighting result includes managing the fighting result of each of the plurality of powerful groups on the basis of the consideration of the fighting game received.

8. The method as claimed in claim 6, further comprising:
determining a registered character satisfying a predetermined condition among registered characters belonging to the group, for each of the plurality of groups, and;
providing a predetermined privilege to the registered character determined.

9. The method as claimed in claim 6, wherein affiliating the newly registered player character with the group includes selecting one group from the plurality of groups on the basis of the operation inputted by the player, and affiliating the newly registered player character after deleting affiliation of the registered character satisfying a predetermined condition from registered characters affiliating with the selected group, when the number of the registered characters affiliating with the selected group is a maximum affiliation number.

10. The method as claimed in claim 1, further comprising:
receiving a consideration of a predetermined game for every player; and
changing the experience value and/or the level of a player character owned by a player when the consideration of the predetermined game is received by the player.

11. The method as claimed in claim 1, further comprising:
receiving an account of a player when each of the players performs the fighting game;
managing play date information for every player on the basis of a receiving date of the account;
storing event information on events having occurred while performing the game in time series; and
outputting the event information that occurred and are stored between a last playing time and this playing time, when the one player performs a new fighting game.

12. The method as claimed in claim 1, further comprising:
storing identification information for making a game apparatus identifiable, the apparatus being used for performing the method; and
displaying the identification information to the player.

13. A storage medium having information recorded thereon, when the information is loaded onto an operating apparatus, the information making the operating apparatus execute the method as claimed in claim 1.

14. A game performing apparatus comprising:
a storage section for storing a player character of each of a plurality of players as a registered character, bringing into correspondence operation input tendency information indicating tendency in operation inputted by a player, a player character owned by the player, and an experience value and/or a level of the player character;
a CPU character selection section for selecting the registered character as a CPU character for a fight according to an operation inputted by the one player of the plurality of players;
a fighting game performing section for performing a fighting game of the CPU character and a player character of the one player, by automatically controlling the CPU character according to the operation input tendency information of the player owning the registered character which is made the CPU character;
an operation input tendency information updating section for updating the operation input tendency information of the one player according to an operation inputted by the one player during the fight;
a fighting result storage section for storing a result of the fight;
a first fighting result updating section for changing the experience value and/or the level of the CPU character according to the result of the fight;
a second fighting result updating section for changing the experience value and/or the level of the player character owned by the one player according to the result of the fight; and
an informing section for informing, when the one player starts a new fighting game, of the result of the fighting game performed with the player character owned by the one player as the CPU character without the one player's knowledge.

15. The apparatus as claimed in claim 14,
wherein the CPU character selecting section selects the registered character which is to be made the CPU character from the registered characters including the player character owned by the one player.

16. The apparatus as claimed in claim 14, wherein the operation input tendency information includes a frequency for every technique type being performed by the player character.

17. The apparatus as claimed in claim 15, wherein the operation input tendency information includes a frequency for every technique type being performed by the player character.

18. The apparatus as claimed in claim 14, further comprising:
a group setting section for setting a plurality of groups with which the player character can be affiliated;
a group affiliation section for affiliating the player character to any one of the plurality of groups set by the group setting section on the basis of an operation inputted by a player who owns a player character, when the newly player character is newly registered as the registered character; and a group fighting result management section for managing a fighting result of each of the plurality of groups on the basis of a result of the fight performed by the fighting section of each of the registered characters;

a determining section for determining a group with a fighting result which satisfies a predetermined condition for deleting a group from the managed fighting result of the each of the plurality of groups;

a group deletion section for deleting the group which have been found out; and an affiliation canceling section for determining affiliation of the character affiliated with the deleted group to be non-fixed.

19. The apparatus as claimed in claim 14, further comprising:

an apparatus identification information storage for storing identification information for making the apparatus identifiable; and an identification information display section for displaying the identification information stored in the apparatus identification information storage to the player.

20. A computer-readable medium that stores a program, when the program is loaded onto an operating apparatus, the program making the operating apparatus execute the method as claimed in claim 1.

* * * * *